United States Patent
Lee et al.

(10) Patent No.: US 9,832,522 B2
(45) Date of Patent: Nov. 28, 2017

(54) IMAGE DISPLAY APPARATUS AND CONTROL METHOD THEREOF

(71) Applicant: LG ELECTRONICS INC., Seoul (KR)

(72) Inventors: Byunghun Lee, Seoul (KR); Kunsik Lee, Seoul (KR); Ryunghwa Rhee, Seoul (KR); Choonkeun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 14/981,466

(22) Filed: Dec. 28, 2015

(65) Prior Publication Data
US 2017/0041660 A1 Feb. 9, 2017

(30) Foreign Application Priority Data
Aug. 5, 2015 (KR) ........................ 10-2015-0110725

(51) Int. Cl.
| | |
|---|---|
| H04N 21/438 | (2011.01) |
| H04N 21/41 | (2011.01) |
| H04N 21/422 | (2011.01) |
| H04N 21/431 | (2011.01) |
| H04N 5/50 | (2006.01) |
| H04N 21/488 | (2011.01) |
| H04N 21/84 | (2011.01) |

(52) U.S. Cl.
CPC .......... *H04N 21/4383* (2013.01); *H04N 5/50* (2013.01); *H04N 21/4126* (2013.01);
(Continued)

(58) Field of Classification Search
CPC .......... H04N 2005/44547; H04N 2005/44556; H04N 2005/44565; H04N 5/44543;
(Continued)

(56) References Cited

U.S. PATENT DOCUMENTS

2004/0250292 A1* 12/2004 Okamoto ............. H04N 5/4401
725/131
2006/0236336 A1* 10/2006 Chen .................... H04N 5/4403
725/37
(Continued)

FOREIGN PATENT DOCUMENTS

| EP | 2804386 A1 | 11/2014 |
| WO | WO 2013/037084 A1 | 3/2013 |

OTHER PUBLICATIONS

Ferraz et al., "A Collaborative TV-Internet Application Model to Enrich TV Viewing Experience in a Pervasive Way," The Sixth IEEE Workshop on Pervasive Collaboration and Social Networking, XP32790149, Mar. 23, 2015, pp. 148-153
(Continued)

*Primary Examiner* — Benjamin R Bruckart
*Assistant Examiner* — Anthony Bantamoi
(74) *Attorney, Agent, or Firm* — Birch, Stewart, Kolasch & Birch, LLP

(57) ABSTRACT

An image display apparatus including a tuner unit configured to receive a broadcast signal; a display unit configured to selectively display a plurality of pieces of broadcast content according to the broadcast signal; a wireless communication unit configured to perform wireless communication with a mobile terminal sensed to be positioned within a predetermined range and receive a plurality of pieces of application content from the mobile terminal; and a controller configured to assign channel information to the plurality of pieces of broadcast content and the plurality of pieces of application content from the mobile terminal; and display content on the display unit corresponding to selected channel information.

15 Claims, 25 Drawing Sheets

(52) U.S. Cl.
CPC ..... *H04N 21/4222* (2013.01); *H04N 21/4312* (2013.01); *H04N 21/4316* (2013.01); *H04N 21/4882* (2013.01); *H04N 21/84* (2013.01)

(58) Field of Classification Search
CPC ............. H04N 21/4622; H04N 21/482; H04N 5/4401; H04N 21/478
See application file for complete search history.

(56) References Cited

U.S. PATENT DOCUMENTS

| | | | |
|---|---|---|---|
| 2007/0274488 A1* | 11/2007 | Callaghan | H04M 1/72519 379/201.01 |
| 2008/0022322 A1* | 1/2008 | Grannan | H04N 5/44591 725/78 |
| 2008/0209062 A1* | 8/2008 | Barrett | H04L 29/06027 709/231 |
| 2011/0010738 A1* | 1/2011 | Carlsgaard | H04N 5/44513 725/37 |

OTHER PUBLICATIONS

Rapporteur For Q4/9, "Consent—draft new Recommendation J.230 (J.cab-mob-req) . . . cable STB and mobile second screen devices," International Telecommunication Union, Study Period 2013-2016, Study Group 9, TD 719 Rev. 1 (GEN/9), XP44153452, Beijing, China, Jun. 10-17, 2015, pp. 1-28.

* cited by examiner

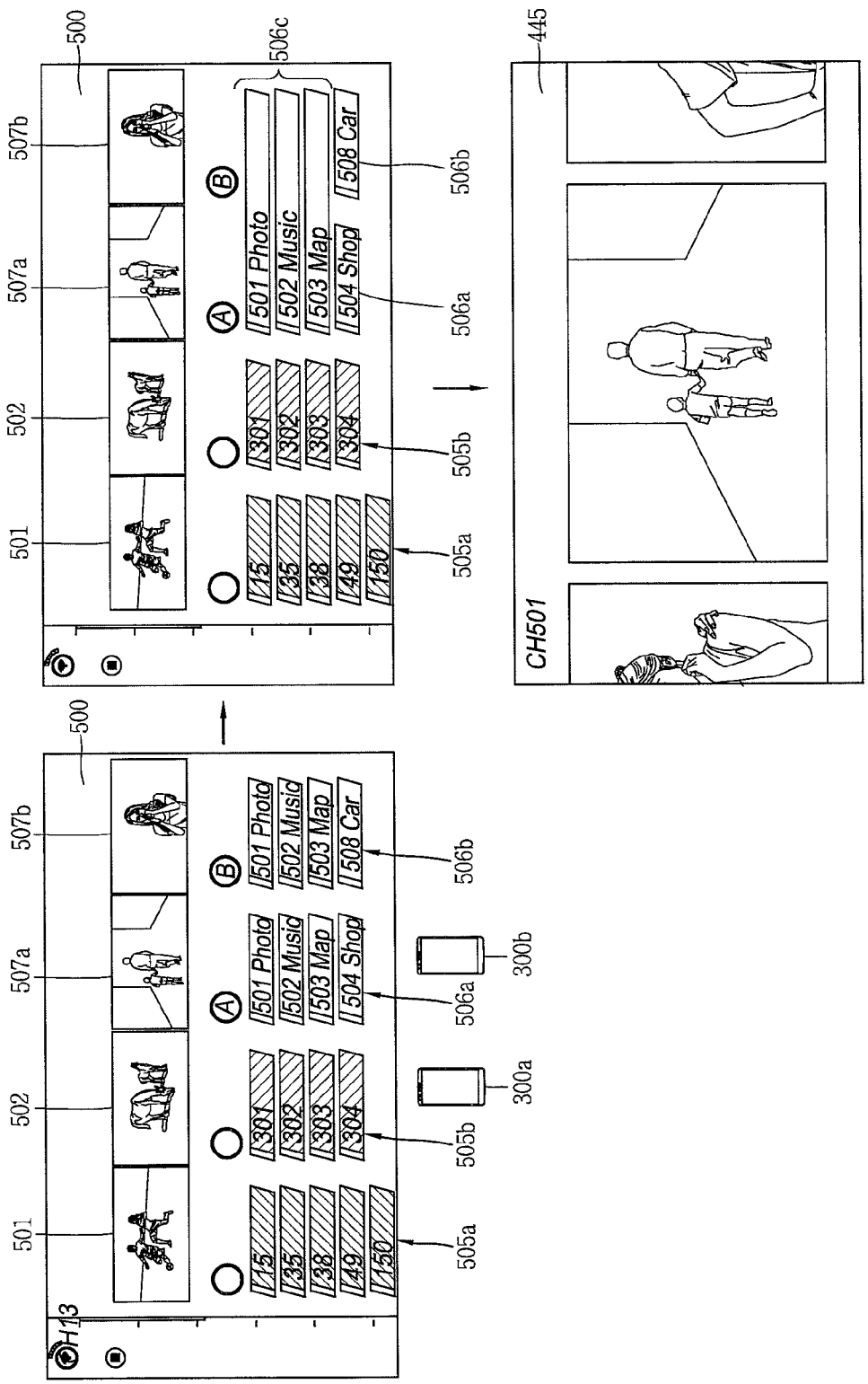

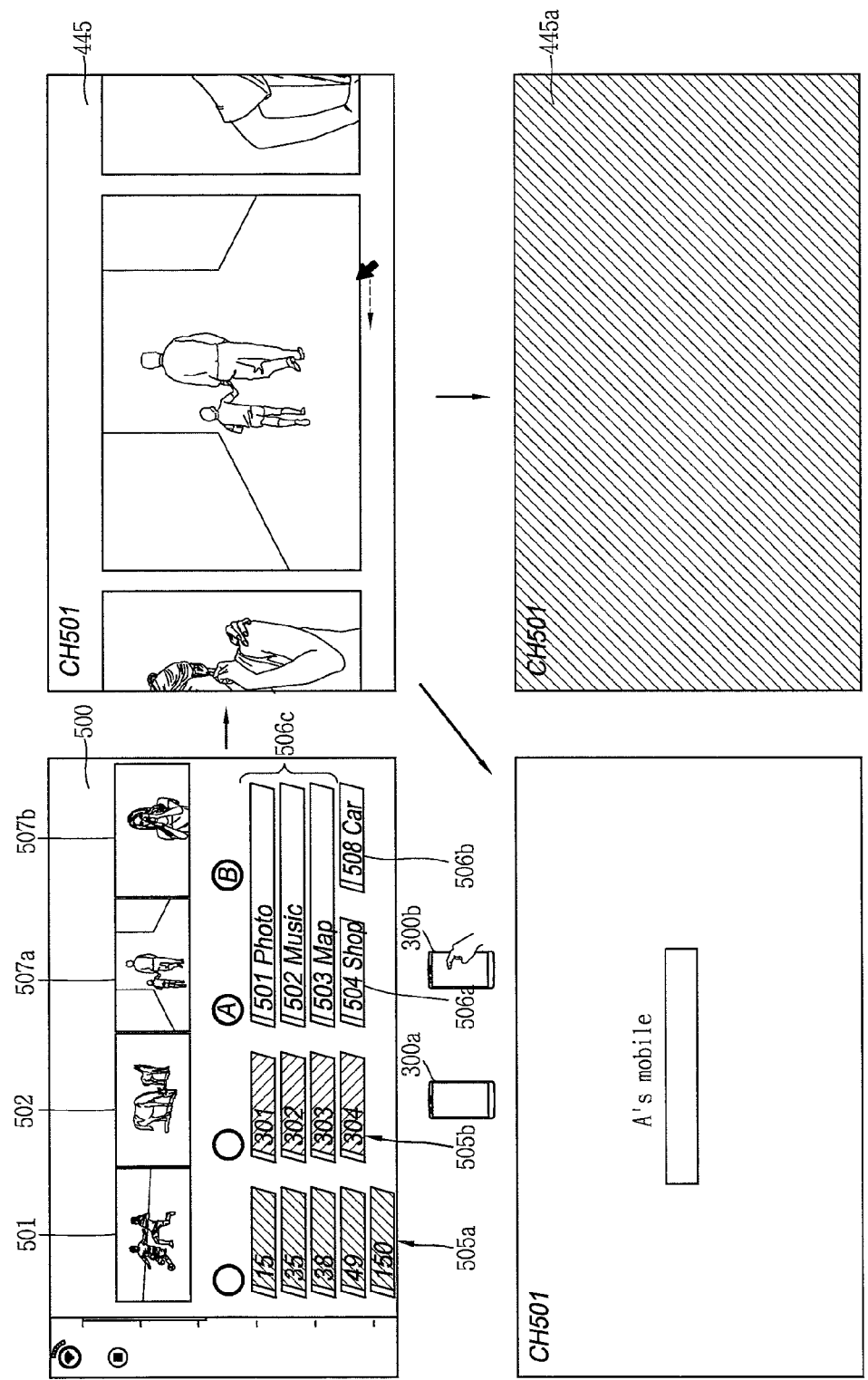

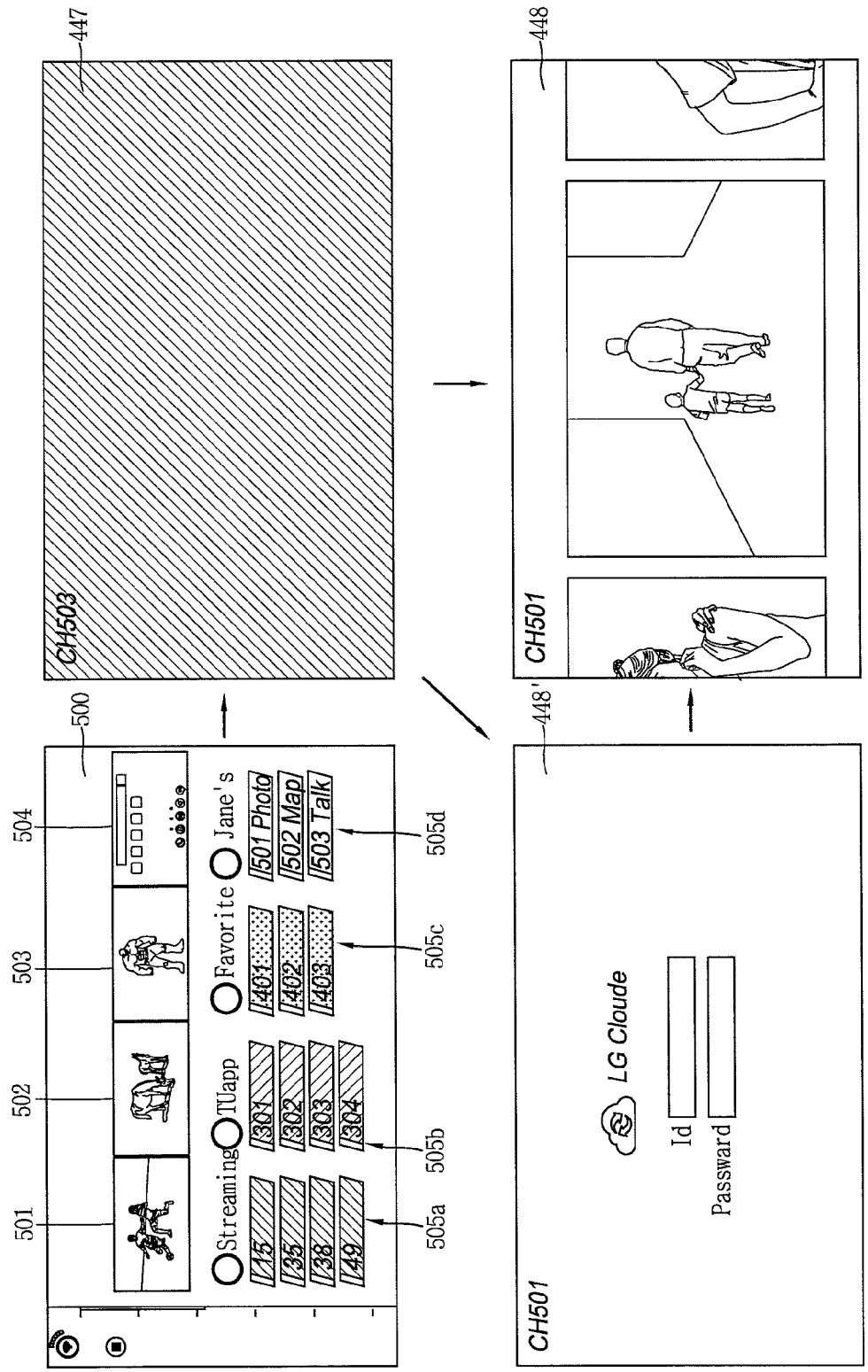

IMAGE DISPLAY APPARATUS AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2015-0110725, filed on Aug. 5, 2015, the contents of which is incorporated by reference herein in its entirety.

BACKGROUND OF THE INVENTION

1. Field of the Invention

The present invention relates to an image display apparatus capable of wireless connection with a mobile terminal, and a control method thereof.

2. Background of the Invention

Image display apparatuses that provide images may be equipped with various functions other than their own unique functions. Also, user interfaces for controlling the various functions tend to be complicated. Recently, image display apparatuses are configured to enable wireless communication with an external device in order to provide content associated with an application installed in the external device through a large screen. However, there is an inconvenience that several control steps should be performed to provide broadcast content formed from broadcast signals and provide content received from external devices.

SUMMARY OF THE INVENTION

Therefore, an aspect of the detailed description is to provide an image display apparatus that can easily output broadcast content and content received from an external apparatus.

To achieve these and other advantages and in accordance with the purpose of this specification, as embodied and broadly described herein, there is provided an image display apparatus including a tuner unit configured to receive a broadcast signal; a display unit configured to selectively output a plurality of pieces of broadcast content according to the broadcast signal, a wireless communication unit configured to perform wireless communication with a mobile terminal sensed to be positioned within a predetermined range and receive a plurality of pieces of application content from the mobile terminal, and a controller configured to assign channel information to the plurality of pieces of broadcast content and the plurality of pieces of application content and control the display unit to output content corresponding to the channel information.

The plurality of first and second channel information bars may include channel numbers and channel associated information and have different shapes, thereby allowing a user to distinguish the output content based on the channel information.

The display unit can output a group guide bar indicating a channel group of currently output content in addition to the plurality of first and second channel information bars. Thus, the user can first select a channel group of desired content among the plurality of channels.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 7A to 7C are conceptual views illustrating a control method that applies channel information to content when a plurality of mobile terminal are wirelessly connected to an image display apparatus;

FIGS. 9A and 9B are conceptual views illustrating a control method for a case that wireless connection between a mobile terminal and an image display apparatus is disconnected.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
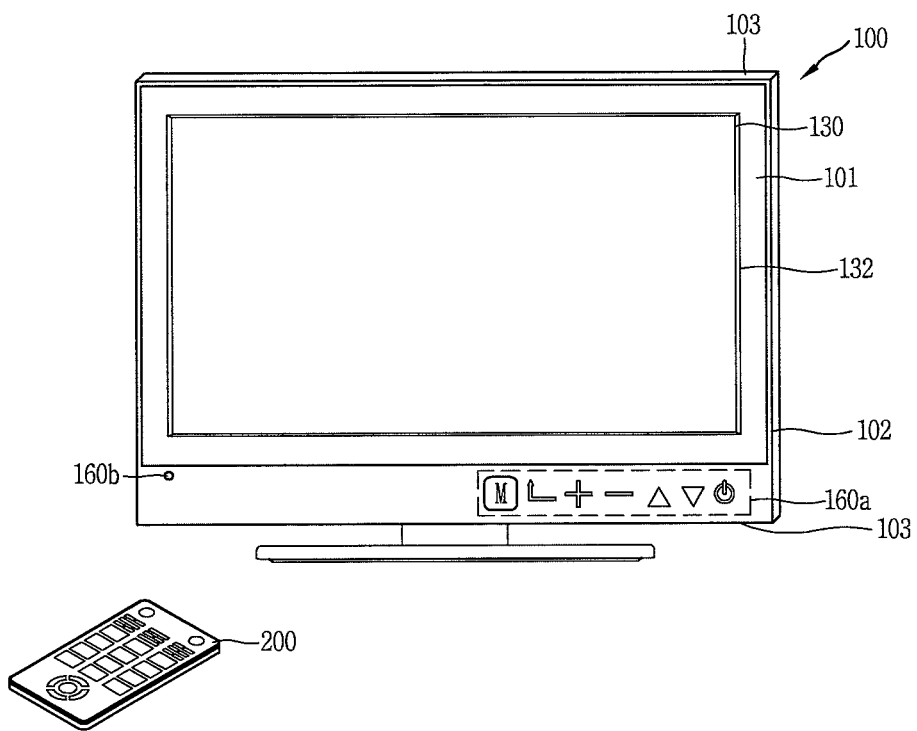
FIG. 1A is a schematic diagram showing a system including an image display apparatus according to an embodiment of the present invention.
Figure 1B:
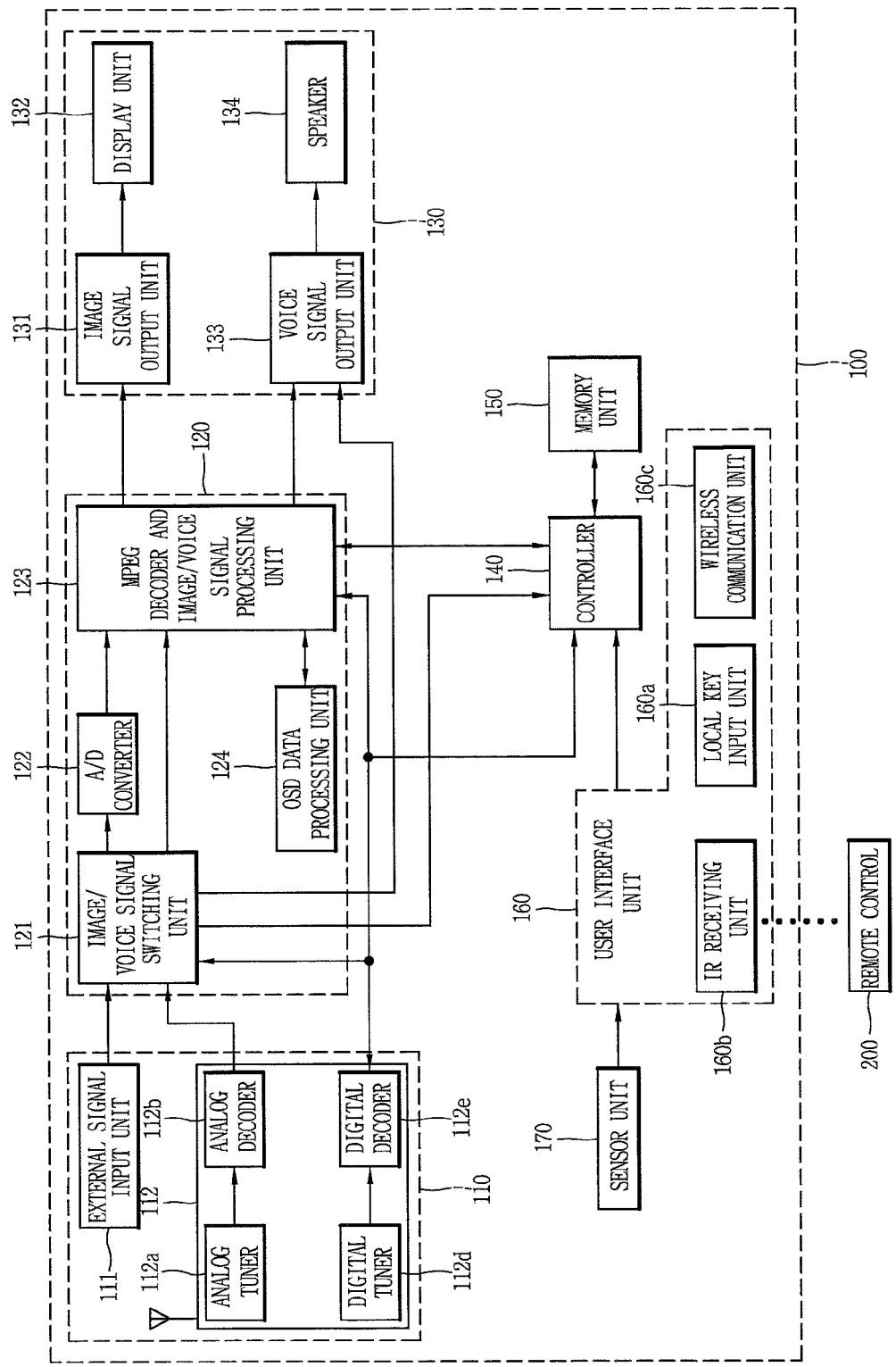
FIG. 1B is a block diagram showing an image display apparatus according to an embodiment of the present invention.

FIG. 1A is a conceptual view of an image display apparatus according to an embodiment of the present invention, and FIG. 1B is a block diagram of an image display apparatus according to an embodiment of the present invention. Referring to FIGS. 1A and 1B, an image display apparatus according to an embodiment of the present invention includes a receiving unit 110, a processing unit 120, an output unit 130, a controller 140, a memory unit 150, and a user interface unit 160.

The receiving unit 110 may include an external signal input unit 111 and a tuner unit 112. The processing unit 120 may include an image/voice signal switching unit 121, an A/D converter 122, a Moving Picture Expert Group (MPEG) decoder and image/voice signal processing unit 123, and an on-screen display (OSD) data processing unit 124. The output unit 130 may include an image signal output unit 131, a display unit 132, a voice signal output unit 133, and a speaker 134.

The external signal input unit 111 receives an external signal from an external apparatus such as a digital versatile disk (DVD), a set-top box, and a camcorder and provides the received external signal to the image/voice signal switching unit 121. The tuner unit 112 tunes at least one channel according to a control signal of the controller 140. The tuner unit 112 decodes or separates an image/voice/data signal received through the tuned channel and provides the image/voice/data signal to the image/voice signal switching unit 121, etc.

The tuner unit 112 can receive information regarding reception sensitivity and signal quality of a broadcast signal according to an embodiment of the present invention and allow the image processing unit 123 to create and provide an image using the received information. The image/voice signal switching unit 121 may include a de-multiplexer configured to select at least one of channels received from the external signal input unit 111 and the tuner unit 112, separate an image/voice signal from the channel as necessary, and then separate an MPEG decoder and image/voice/data signal.

When the image/voice signal switching unit 121 selects an analog signal and divides the analog signal into an image signal and a voice signal, the AD converter 122 can convert the analog image signal into digital image signal and provide the digital image signal to the MPEG and image/voice signal processing unit 123 and provide the analog voice signal to the voice signal output unit 133. On the other hand, when the image/voice signal switching unit 121 selects a digital signal, an image signal and a voice signal of the digital signal can be provided to the MPEG decoder and image/voice signal processing unit 123.

The MPEG decoder and image/voice signal processing unit 123 restores an image/voice stream among output signals of the image/voice signal switching unit 121 to image/voice data and provides the processed image signal to the image signal output unit 131. In addition, the MPEG decoder and image/voice signal processing unit 123 may mix OSD data created by the OSD data processing unit 124 with the restored and processed image signal.

In particular, the processing unit 120 according to an embodiment of the present invention includes an OSD data processing unit 124. The OSD data processing unit 124 senses whether a control signal is input from a user by controller 140 while performing an image output mode. When the control signal has not been input for a certain time, the OSD data processing unit 124 adjusts transparency of a displayed screen to create an on-screen data (OSD). The OSD created by the OSD data processing unit 124 is adjusted to gradually decrease or increase its transparency under control of the controller 140.

The image signal output unit 131 outputs an image signal output from the MPEG decoder and image/voice signal processing unit 123 and an OSD layer processed from the OSD data processing unit 124. In addition, the image signal output unit 133 outputs, through a speaker 134, a voice signal output from the MPEG decoder and image/voice signal processing unit 123. In particular, when the transparency of the OSD layer is adjusted according to an embodiment of the present invention, the audio output may be temporarily paused or its volume may be turned down.

The user interface unit 160 may include, for example, a local key input unit 160a included in the image display apparatus, an IR receiving unit 160b configured to receive a control signal from a remote control, and a wireless communication unit 160c configured to transmit and/or receive information to and/or from the external apparatus.

Referring to FIG. 1A, the local key input unit 160a may be formed in a region adjacent to the display unit 132. For example, the local key input unit 160a may be formed on a front surface 101 on which the display unit 132 of the image display apparatus 100 is formed. As shown in FIG. 1A, the local key input unit 160a may be formed adjacent to a button portion of the display unit 132. However, a position where the local key input unit 160a is formed on the image display apparatus 100 is not limited thereto, and the local key input unit 160a may be formed on a left or right surface 102 of the image display apparatus 100 and a top or bottom surface 103 of the image display apparatus 100.

In addition, the local key input unit 160a may employ any manner as long as the manner allows a user to perform manipulation with a tactile feeling. For example, the local key input unit may be implemented as a dome switch, a touch screen, or a touch pad, which may receive a signal according to a push or touch manipulation by the user. A signal received through the local key input unit 160a may be set in various ways, and the local key input unit 160a may include a plurality of input keys that independently receive a control signal.

Referring to FIG. 1A, the local key input unit 160a may include at least six input keys. For example, the local key input unit 160a may include channel change input keys (Δ/∇) for increasing/decreasing a channel number to change a channel, volume adjustment input keys (+/−) for increasing/decreasing the volume of sound output through the speaker 134, a menu (M) input key for receiving a control signal for displaying an on-screen display (OSD) used to change settings of various types of information output from the image display apparatus 100, and a confirm input key for applying an input signal for changing the setting of information in the OSD.

When an input of moving in four directions is needed, the two channel change input keys and the two volume adjustment input keys may be used to receive control signals of moving up, down, left, and right. The local key input 160a may further include a power input key for receiving a control signal of powering on/off the image display apparatus 100.

In addition, the plurality of input keys may be arranged adjacent to one another, but is not limited thereto. Input keys for generating control signals for controlling irrelevant functions may be disposed in different regions separated from one another on the image display apparatus 100.

The input keys receives various commands and information from a user, converts the received commands and information into control signals, and delivers the control signal to the controller 140. Specifically, the user interface unit 160 according to an embodiment of the present invention senses that a control signal has not input for a predetermined time while performing an image output mode and allows the transparency of the display screen to be adjusted. The controller 140 controls the tuner unit 112, the image/voice signal switching unit 121, and the MPEG decoder and image/voice signal processing unit 123. The controller 140 can be connected to control other elements of the image display apparatus 100 as necessary.

The user interface unit 160 may further include an IR receiving unit 160*b* configured to receive a control signal from a remote control 200, and the IR receiving unit 160*b* may be formed on a front surface 101 of the image display apparatus 100. A control signal input through the local key input unit 160*a* may be applied to the image display apparatus 100 using the remote control 200.

That is, a user can control the image display apparatus 100 using any one of the local key input unit 160*a* and the IR receiving unit 160*b* that is wirelessly connected to the remote control 200. The IR receiving unit 160*b* may be formed on the front surface 101 of the image display apparatus 100 adjacent to the display unit 132 in order to receive a radio signal emitted by the remote control. In addition, the IR receiving unit may be disposed adjacent to or separate from the local key input unit 160*a*.

The controller 140 recognizes whether a control signal is input through the user interface unit 160 while performing the image output mode. Specifically, the controller 140 according to an embodiment of the present invention determines which of the local key input unit 160*a* and the IR receiving unit 160*b* has applied the control signal, and controls the display unit 132 such that an on-screen display (OSD) is displayed at a different position on the display unit 132 depending on the determination.

Here, the OSD corresponds to a pop-up window for displaying adjustable setting information that allows a user to directly optimize a screen of the display unit 132. The user can optimize the screen by adjusting the setting information of the screen included in the OSD that has appeared in the screen and utilizing a test program.

Referring to FIG. 1A, the display unit 132 outputs screen information. Here, the screen information corresponds to visual information converted from a signal received from the receiving unit 110 and the external signal input unit 110. That is, the screen information may correspond to an image corresponding to a broadcast signal, an image based on an external signal received from an external apparatus, or the like and has no limitations in terms of the type. The controller 140 can touch (apply a pressure to) an input key included in the local key input unit 160*a* or an input key included in the remote control 200 to output additional information on the detailed settings and may change settings included in the additional information.

The memory unit 150 stores information entered by the user or data created and managed by the controller 140. The sensor unit 170 may be formed in a region adjacent to the display unit 132. The sensor unit may be implemented as a proximity sensor to sense a user positioned adjacent to the display unit.

According to a control method according to an embodiment of the present invention, when a control signal for executing substantially the same functions is received through the local key input unit 160*a* or through the IR receiving unit 160*b* using the remote control 200, the controller 140 controls the display unit 132 to output the OSD at a different position on the display unit 132 based on the control signal. When the image display apparatus 100 according to an embodiment of the present invention is wirelessly connected to a mobile terminal, the image display apparatus 100 maps and provides application content installed in the mobile terminal and channels of the image display apparatus 100.

Figure 2A:
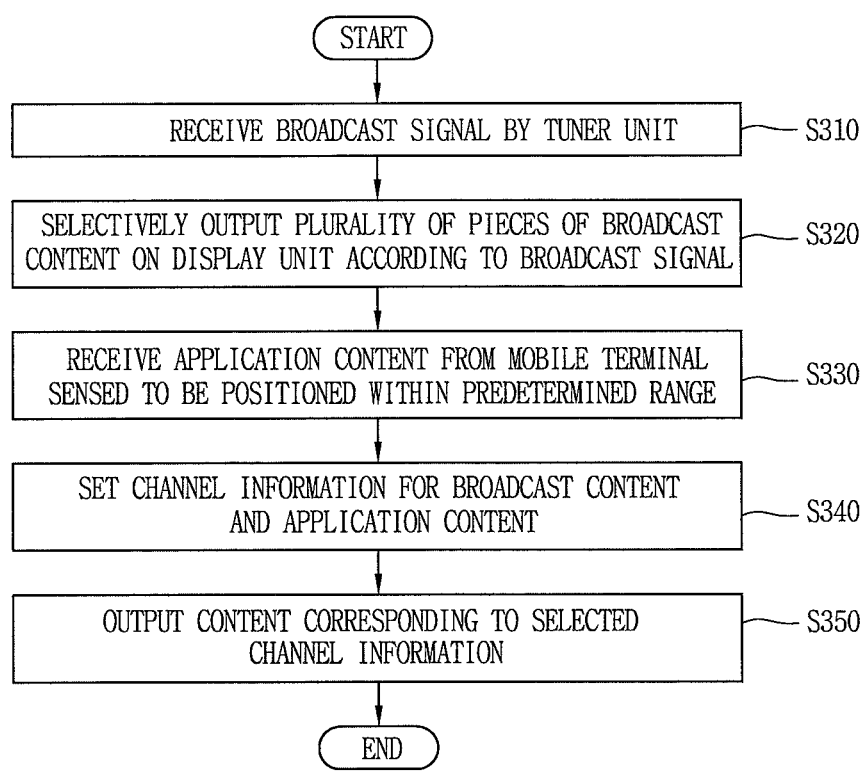
FIG. 2A is a conceptual view illustrating a control method of an image display apparatus according to an embodiment of the present invention.
Figure 2B:
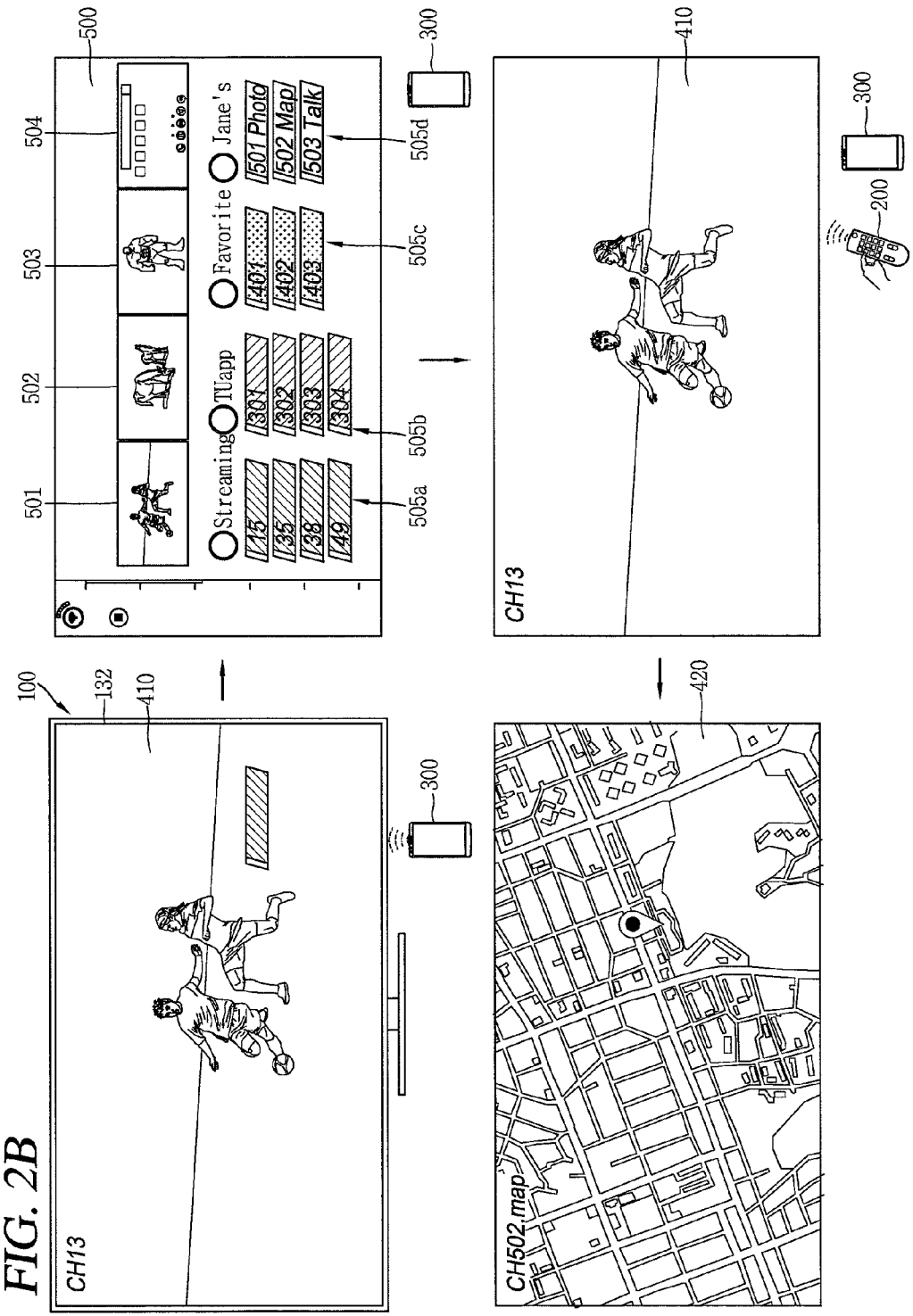
FIG. 2B is a conceptual view illustrating the control method of FIG. 2A.

FIG. 2A is a conceptual view illustrating a control method of an image display apparatus according to an embodiment of the present invention, and FIG. 2B is a conceptual view illustrating the control method of FIG. 2A. The controller 140 receives a broadcast signal using the tuner unit 112 (S310). The tuner unit 112 forms broadcast content corresponding to a tuned channel. The display unit 132 selectively outputs a plurality of pieces of broadcast content according to the broadcast signal (S320). The controller 140 outputs tuned broadcast content based on a control signal received from the remote control 200. Referring to FIG. 2B, when the display unit 132 is activated, the controller 140 outputs broadcast content 410. The broadcast content 410 is output based on a broadcast signal that is received in real time.

When it is sensed that the mobile terminal 300 is positioned within a predetermined range, the controller 140 receives application content from the mobile terminal 300 (S330). The wireless communication unit 160*c* senses an external apparatus (e.g., a mobile terminal) in the vicinity of the image display apparatus 100. For example, the mobile terminal 300 can continuously output information with low power, and when the low power is sensed, the wireless communication unit 160*c* can sense that the mobile terminal 300 is nearby. The low power may be implemented using Bluetooth Low Energy (BLE). When the image display apparatus 100 is wirelessly connected to the mobile terminal 300, the controller 140 receives application content stored in the mobile terminal 300. The controller 140 can receive the content while the mobile terminal 300 is kept activated and block the communication when the mobile terminal 300 is deactivated.

The controller 140 sets channel information for the application content and channel information for the broadcast content (S340). The application content and the broadcast content may be matched with continuous channel information, but are not limited thereto. A distinct number may be matched with the channel information, but visual information indicating the channel information is not limited to the number.

The controller 140 can match a plurality of applications installed in the mobile terminal to different channels or match groups of content included in the plurality of application with different channels. When the application content is received, the controller 140 controls the display unit 132 to output a channel information screen 500 including the channel information for the application content and the broadcast content.

The channel information screen 500 includes first to fourth channel group images 501, 502, 503, and 504 and first to fourth channel information bars 505*a*, 505*b*, 505*c*, and 505d included in the channel group images 501, 502, 503, and 504, respectively. For example, the first channel group 501 includes channels associated with streaming content that uses a broadcast channel received from a server, the second channel group 502 includes channels associated with application content installed in the image display apparatus, and the third channel group 503 includes channels of favorite content of a user of the image display apparatus. When the mobile terminal 300 is wirelessly connected to the image display apparatus, a fourth channel group is formed. The fourth channel group 504 includes channels of the application content stored in the mobile terminal 300.

The first to fourth channel information bars each include a plurality of channel information bars. The plurality of channel information bars included in each of the first to fourth channel information bars may be formed in different shapes. The channel information bars included in different channel groups may be formed in different colors. The plurality of channel information bars are assigned respective numbers, and each channel information bar may include information regarding content corresponding to the channel.

Each of the first to fourth channel group images 501, 502, 503, and 504 may be composed of content corresponding to one of a plurality of channels included in its channel group. The content composing the channel group image may change in sequence. The application content having the channel information may be sequentially displayed as the fourth channel group image 504. User information of the mobile terminal 300 that is wirelessly connected to the image display apparatus 100 may be displayed in a bottom portion of the fourth channel group image 504.

The channel screen information 500 may be automatically output when the mobile terminal 300 is sensed and wirelessly connected, but is not limited thereto. After the mobile terminal 300 is wirelessly connected to assign channel information to application content, the display unit 132 can output the channel screen information 300 based on a control command from the user. The controller 140 can control the display unit 132 to output predetermined content or to output the broadcast content 410 again after the channel screen information 500 is output during a predetermined period of time based on a control command applied to the channel screen information 500.

The controller 140 can change the channel according to the control command applied by the remote control 200 (or the mobile terminal 300). The controller 140 controls the display unit 132 to output content corresponding to the changed channel. The content may correspond to the application content 420 of the mobile terminal 300. When a channel change control command is received by the remote control 200, the controller 140 sequentially changes channels and provides content assigned to each channel. Thus, the user can receive an execution screen of an application of the mobile application while watching the content according to a broadcast signal stream.

The channel change control command may correspond to a control signal for sequentially changing the channel number (e.g., a channel command for slightly or significantly changing the channel number on the remote control) or a control signal for inputting a number corresponding to the channel.

When the application content 420 is output, a corresponding application may be executed and controlled based on the control command through the mobile terminal 300 or the remote control 200. When the content of the application corresponding to a predetermined channel is output, the mobile terminal 300 can output the execution screen of the application. The user can apply the control command to the mobile terminal to control the application. An execution screen of the application controlled in the mobile terminal is output to the display unit 132. In addition, while a channel corresponding to content of the mobile terminal is output to the image display apparatus, the mobile terminal can output notification information about the output.

When the channel change control command is applied again, the controller 140 controls the display unit 132 to output content of another application, broadcast content, or content of an application installed in the image display apparatus again.

According to an embodiment of the present invention, substantially the same channel information as channels of the broadcast content is assigned to content associated with the application installed in the mobile terminal, and the application content and the broadcast content are selectively output based on the channel change. Thus, the user need not execute another program or apply an additional control command in order to receive the content stored in the mobile terminal.

Figure 3A:
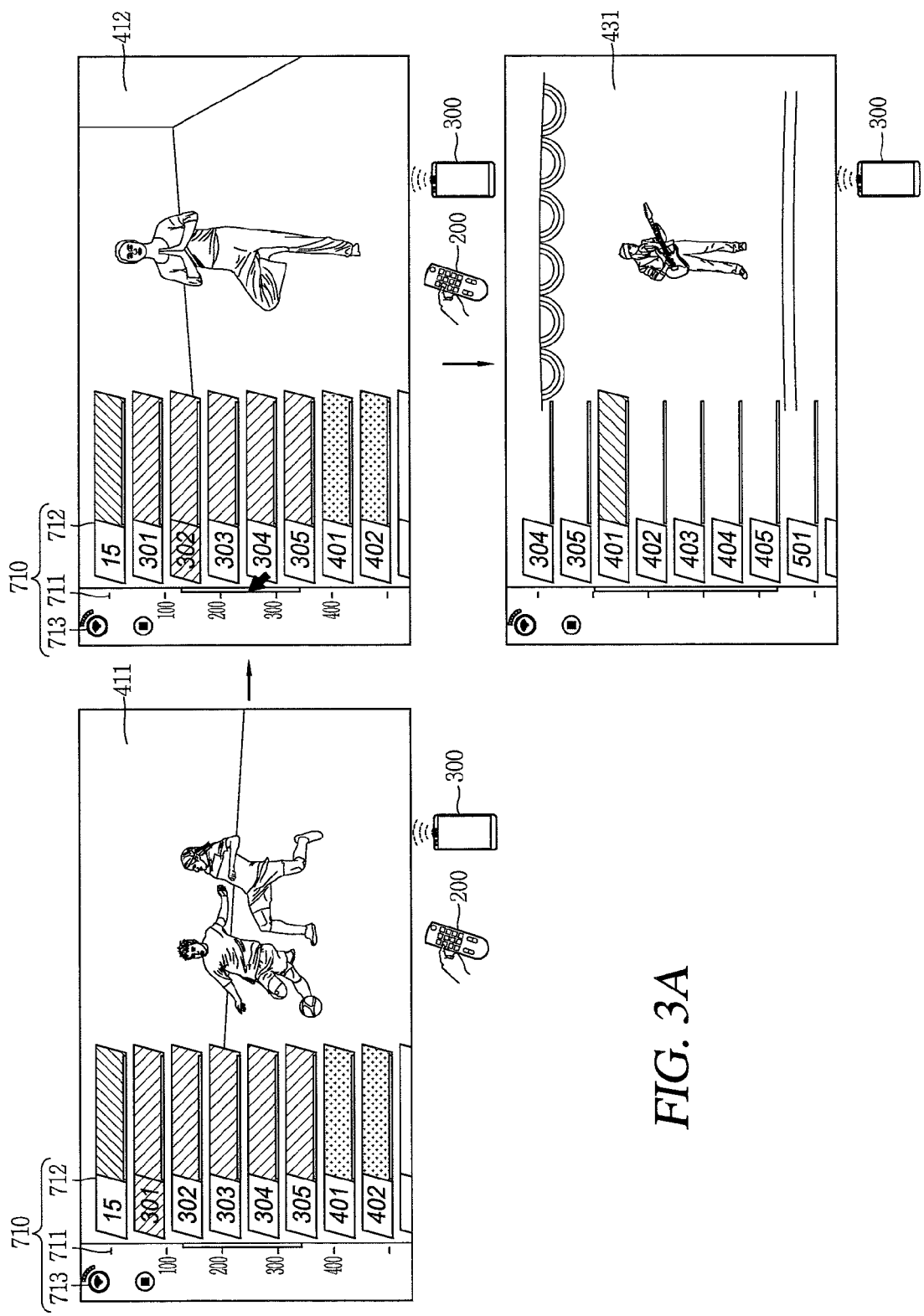
FIGS. 3A to 3C are conceptual views illustrating a control method that displays channel information according to various embodiments.
Figure 3B:
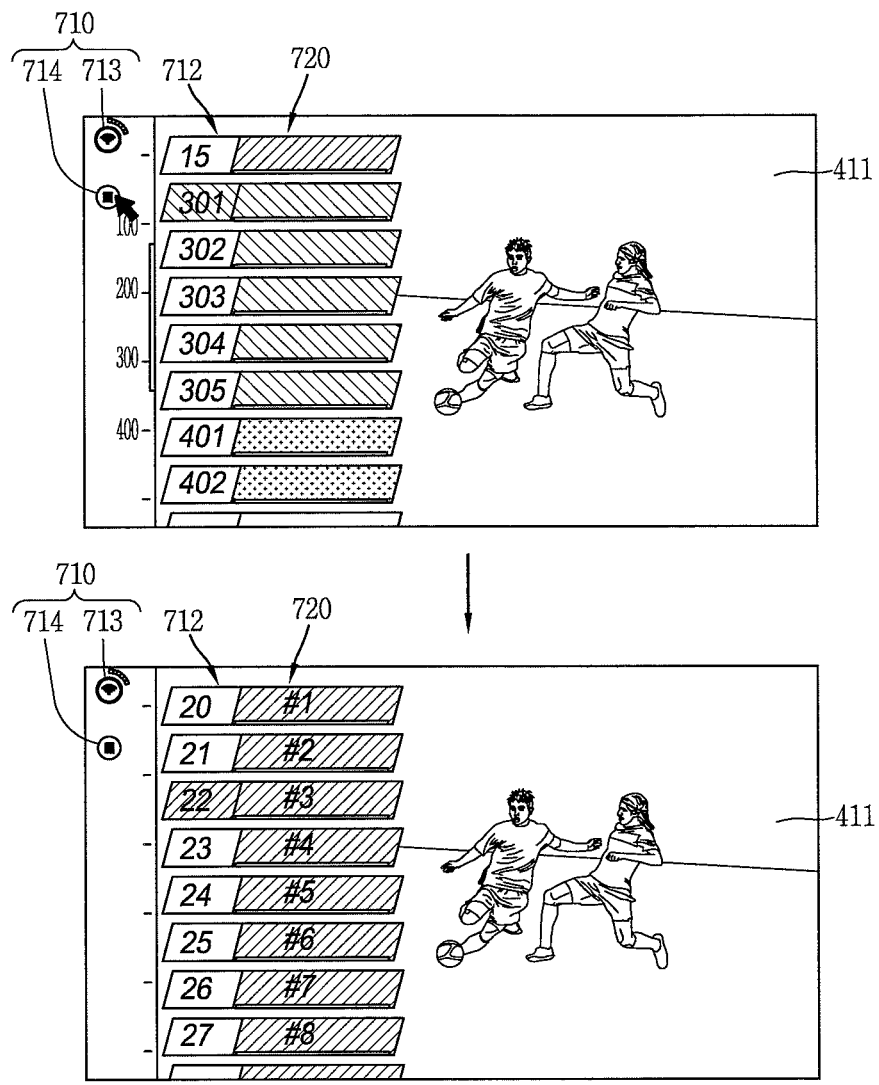
Figure 3C:
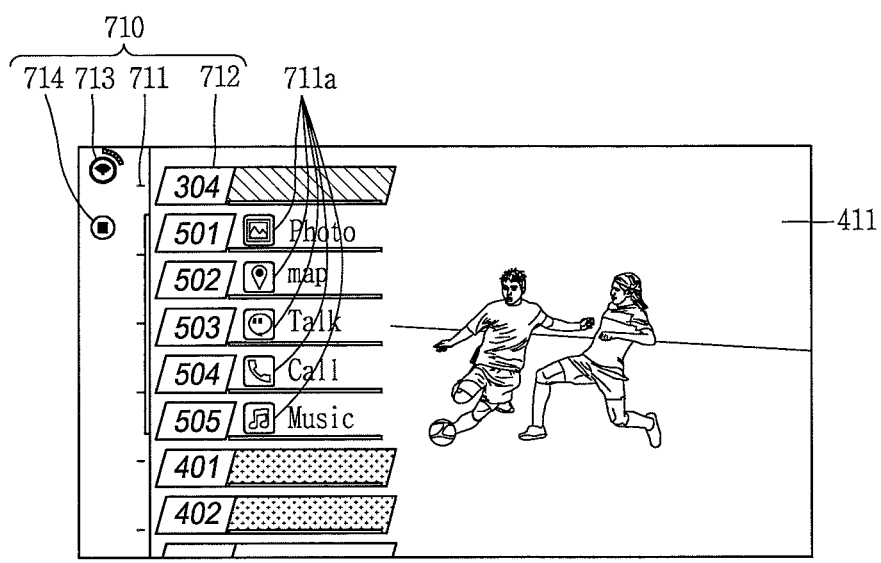

Next, FIGS. 3A to 3C are conceptual views illustrating a control method that displays channel information according to various embodiments. Referring to FIG. 3A, when the channel change control command is applied, the controller 140 controls the display unit 132 to output a channel list 710. The channel list 710 includes a plurality of channel information bars 712 arranged in sequence. For example, the plurality of channel information bars 712 may be arranged in the corresponding order of channel numbers, but is not limited thereto.

The channel information bars 712 may be formed in different shapes corresponding to the distinct channel groups. For example, the channel information bars 712 may be displayed in different colors corresponding to the channel groups. The channel list 710 may include a group guide bar 711. The group guide bar 711 extends in a direction in which the channel information bars 712 are arranged, and indicates a channel number. The group guide bar 711 indicates a channel group to which currently displayed content belongs.

When the controller 140 changes the group using the group guide bar 711, the controller 140 can change the group of the currently output content based on the control command applied to the group guide bar 711. For example, while a channel corresponding to the current broadcast content is selected, the group guide bar 711 indicates a channel group corresponding to the broadcast content. In this instance, when the channel group is changed to a channel group corresponding to the application content based on the control command, the display unit 132 outputs content corresponding to any one piece of the application content (e.g., content corresponding to the smallest channel number). Many channels may be set between the initial channel and the changed channel. Thus, the user can directly move to a desired channel group without pressing the channel number or passing the channels arranged in sequence.

Referring to FIG. 3A, while the display unit 132 outputs first broadcast content 411, the display unit 132 changes the channel and outputs second broadcast content 412. In this instance, the group guide bar 711 indicates a first channel group indicating the broadcast content. While the second broadcast content 412 is output, the first channel group may be changed to a second channel group indicating the application content using the group guide bar 711.

When the change to the second channel group is made, the display unit 132 outputs a first application content 431 in which one piece of channel information included in the second channel group is set. The group guide bar 711 is composed of the second channel group corresponding to the application content. The first application content 431 may correspond to content having the smallest channel number or may correspond to a channel previously selected by the user.

A control method that provides the application content to a subchannel will be describe with reference to FIG. 3B. Referring to FIG. 3B, the channel list 710 includes a communication image 713 and a sub-content icon 714 in a region adjacent to the channel guide bar 711. The communication image 713 indicates the existence of the mobile terminal 300 that is wirelessly connected to the image display apparatus 100.

The sub-content icon 714 corresponds to an icon for channelizing and providing content associated with the currently output content. When the sub-content icon 714 is selected while the first broadcast content 411 is output, the controller 140 assigns a subchannel to content associated with the first broadcast content 411. While the first broadcast content 411 is output, the display unit 132 outputs the subchannel list 720 corresponding to the associated content.

For example, when a series of the first broadcast content 411 is output through a different channel, or when the series is included in the application content, the controller 140 can channelize and provide the series. The subchannel list 720 may include a plurality of subchannel bars including different content information.

According to an embodiment of the present invention, since other content associated with the currently output content may be received at one time, it is not necessary to retrieve the content stored in the mobile terminal or execute an application installed in the image display apparatus.

Referring to FIG. 3C, the display unit 132 can display information regarding the application on the channel information bar 712 corresponding to the application content. For example, the channel information bar 712 may output an application icon 711a that may execute corresponding application content. The application icon 711a may be subsequently the same as an icon output to the mobile terminal 300, but is not limited thereto. Alternatively, the channel information bar 712 may include a corresponding application name as a text. Thus, the user can more easily distinguish content information of a corresponding channel from a channel of the broadcast signal.

Figure 4A:
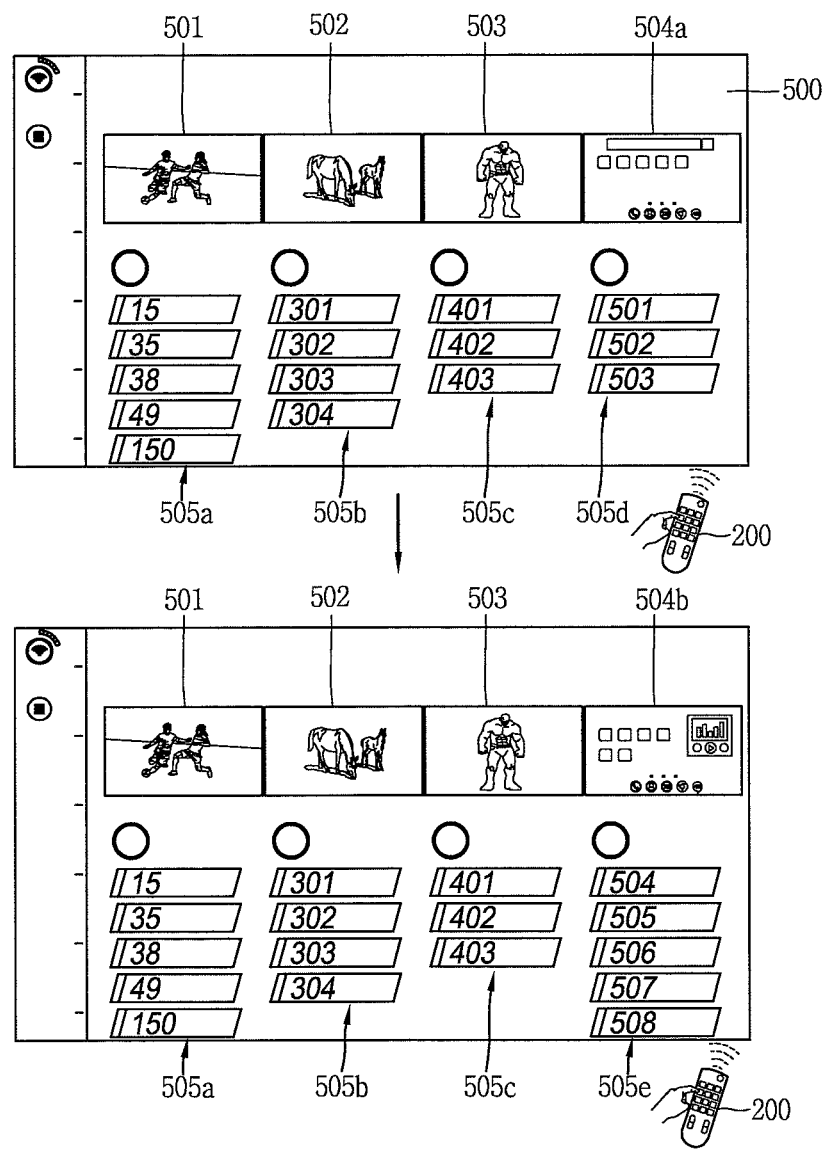
FIGS. 4A to 4C are conceptual views illustrating a channel information screen including application content assigned channel information.
Figure 4B:
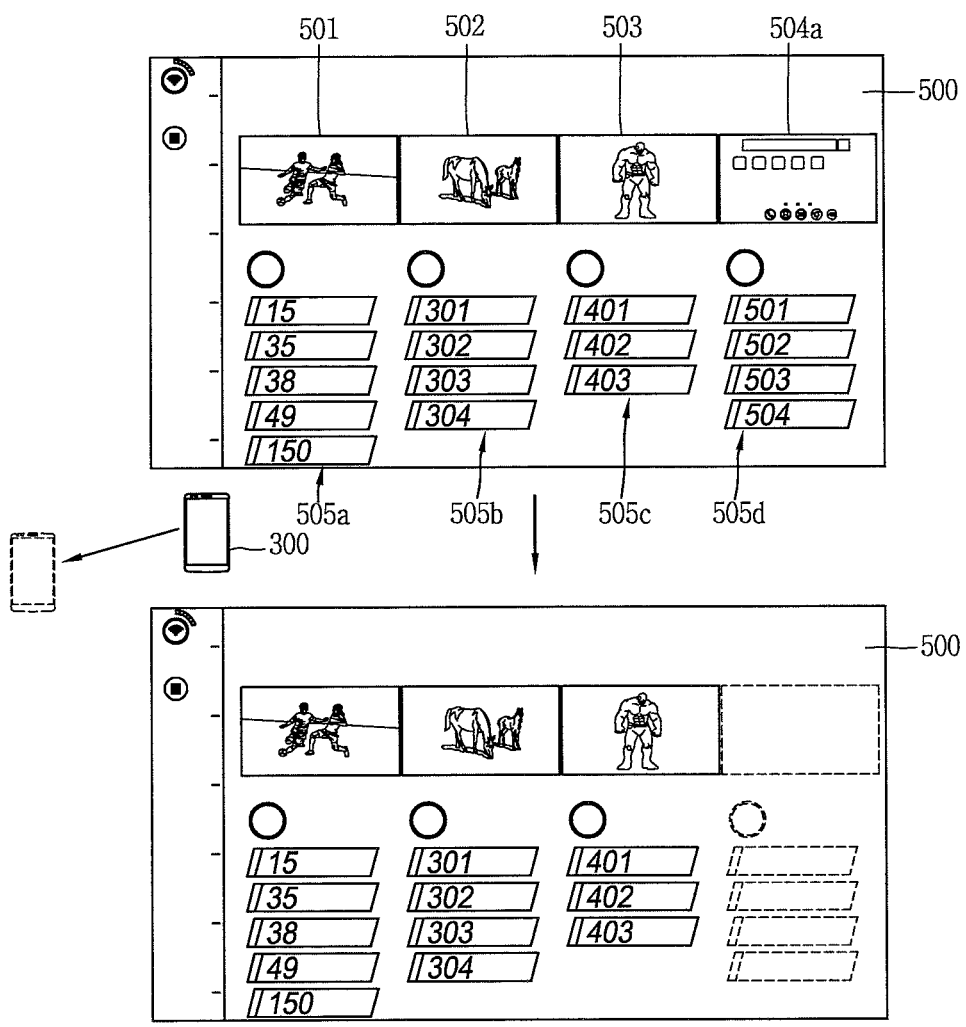
Figure 4C:
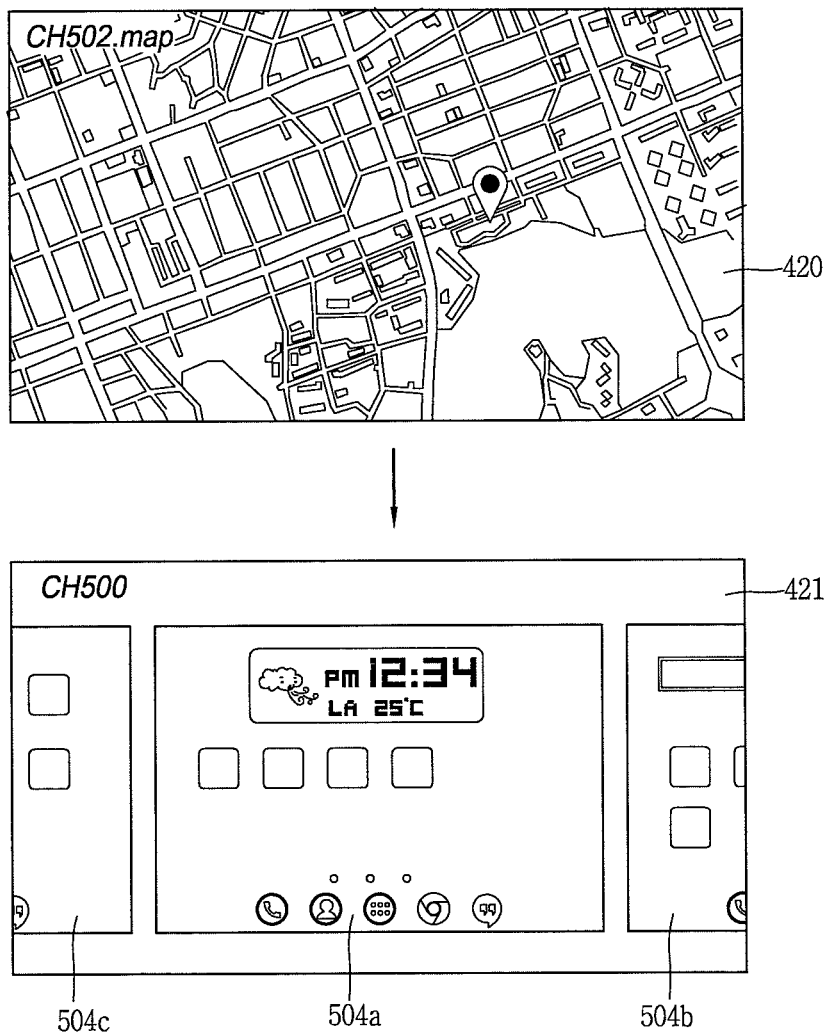

Next, FIGS. 4A to 4C are conceptual views illustrating a channel information screen including application content assigned channel information. Referring to FIG. 4A, the display unit 132 includes first to fourth channel group images 501, 502, 503, and 504a corresponding to the first to fourth channel groups and first to fourth channel information bars 505a, 505b, 505c, and 505d included in the channel groups. Content images included in respective channel groups may be sequentially output as the first to third channel group images 501, 502, and 503.

The fourth channel group image may be composed of a home screen page output to the mobile terminal. Here, the home screen page is output to a display unit of the mobile terminal 300 and includes an icon corresponding to at least one application. The mobile terminal can execute a corresponding application based on a touch applied to the icon included in the home screen page. The mobile terminal can include a plurality of home screen pages that are output selectively. The plurality of home screen pages may be formed in different icons, and layouts in which the icons are arranged may be different from one another.

When the mobile terminal 300 is wirelessly connected, and channel information is assigned to the application content, the display unit 132 can output a first home screen page 504a among the plurality of home page screens as the channel group image. For example, while receiving the application content, the controller 140 can receive capture images of the home screen pages.

The display unit 132 can preferentially channelize the application content corresponding to an icon included in the first home screen page 504a. That is, the channel number assigned to the application content may be formed adjacent between applications of the icon included in the first home screen page 504a. While the display unit 132 outputs the first home screen page 504a to the channel group image, the display unit 132 can output at least one first channel information bar 505d corresponding to application content of the icon included in the first home screen page 504a.

The controller 140 can switch from the first home screen page 504a to a second home screen page 504b based on the control command applied through the remote control 200 or the mobile terminal 300. The second home screen page 504b may be output next to the first home screen page 504a on the mobile terminal 300. The display unit 132 can also output at least one second channel information bar 505e corresponding to the application content include in the second home screen page 504b.

The number of first channel information bars 505d may be different from the number of second channel information bars 505e, and the numbers may be substantially the same as the number of icons included in the home screen page. In addition, when a control command for selecting the first home screen page 404a is applied, the controller 140 can control the display unit 132 to output application content corresponding to any one of the first channel information bars 505d. According to an embodiment of the present invention, the user can easily recognize application content assigned channel information using a home screen page displayed on the mobile terminal, and easily retrieve desired application content because the channel information is assigned while being arranged in a plurality of home screen pages.

Referring to FIG. 4B, when wireless connection between the mobile terminal 300 and the image display apparatus 100 is disconnected, the controller 140 controls the display unit 132 to output the channel information screen 500 from which the first home screen page 404a and the first channel information bar 505d have disappeared. When a communication with the mobile terminal 300 is blocked while the channel information screen 500 is output, the controller 140 can control the display unit 132 to modify and output the home screen page and the channel information bar.

For example, the display unit 132 allows information regarding the disconnected mobile terminal to be unrecognizable and then outputs the unrecognizable information. Thus, when the mobile terminal is unintentionally powered off or disconnected, the user can control the mobile terminal to be connected with the image display apparatus.

Referring to FIG. 4C, the controller 140 can assign one piece of channel information that allows a home screen page including a plurality of application icons to be output. For example, when channel information of No. 501 is assigned to the application content, the home screen page can be output to the channel information of No. 500 as content.

When channel No. 500 is selected, the controller 140 controls the display unit 132 to sequentially output the first to third home screen pages 504a, 504b, and 505c. The first to third home screen pages 504a, 504b, and 505c may be selectively output based on a control command from the user.

In addition, when one home screen page is selected, the controller 140 can change the channel to selectively output one of pieces of application content included in the home screen page. In addition, channel information assigned to the application content may be further output to the home screen page. According to an embodiment of the present invention, the user can easily recognize the application content assigned channel information through the home screen page of the mobile terminal associated with the content received from the mobile terminal.

The image display apparatus can match an application installed in the mobile terminal and information regarding the application installed in the mobile terminal with channel information of the image display apparatus. However, the mobile terminal can selectively assign the channel information to the application and its relevant information based on the setting by the user. A control method that selectively matches some of information received through the mobile terminal with channels will be described.

Figure 5A:
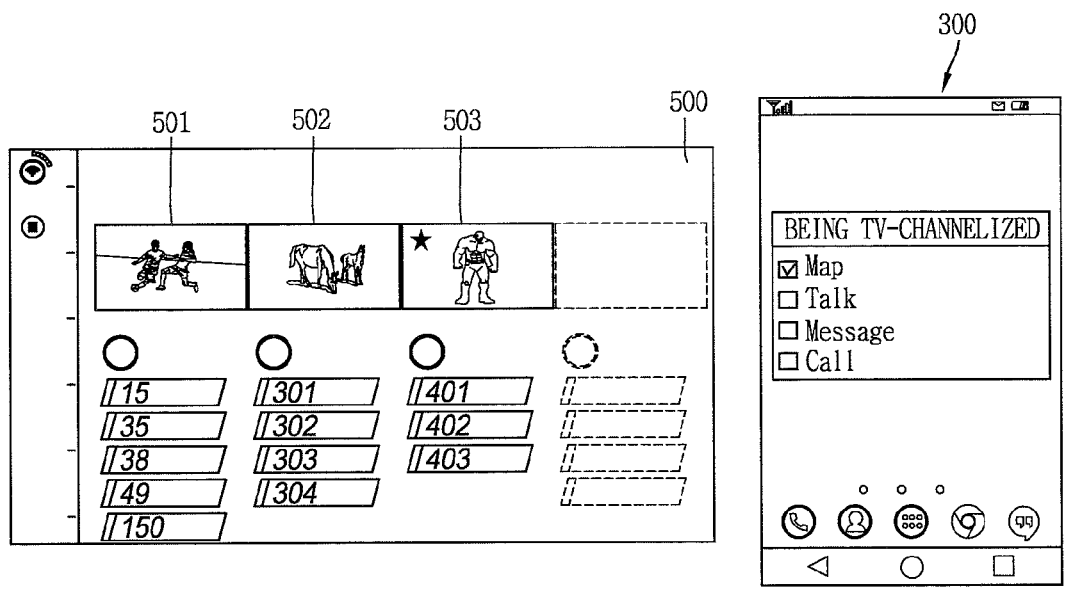
FIGS. 5A to 5C are conceptual views illustrating a control method that selectively assigns channel information to some of application content.
Figure 5B:
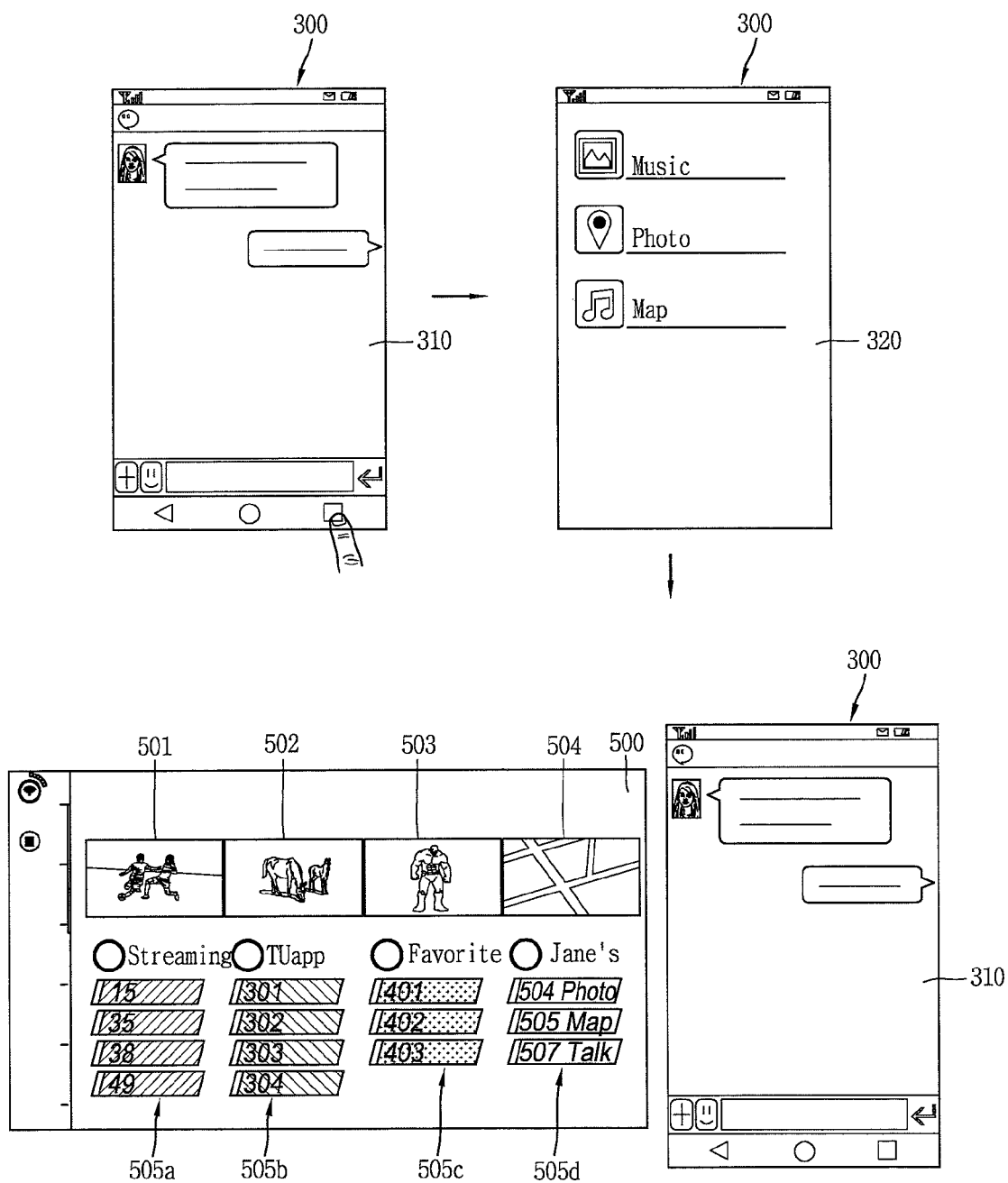
Figure 5C:
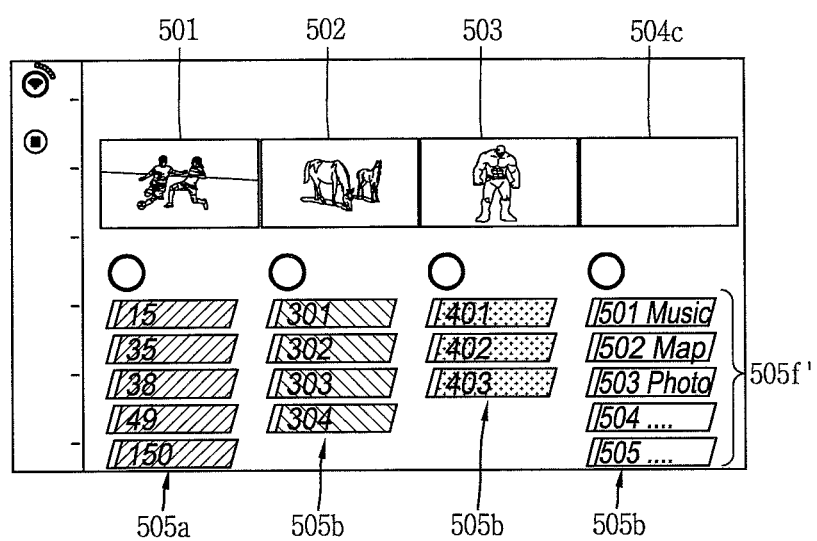

Next, FIGS. 5A to 5C are conceptual views illustrating a control method that selectively assigns channel information to some application content. Referring to FIG. 5A, when the image display apparatus 100 is wirelessly connected to the mobile terminal 300, the controller 140 can transmit a content reception request signal to the mobile terminal 300. When the request signal is received, the mobile terminal can output a content selection window.

The content selection window outputs information regarding the wirelessly connected image display apparatus and a content list including the type of application content that may be transmitted to the image display apparatus. Alternatively, the controller 140 can select the application content to be transmitted to the image display apparatus based on a touch applied on the content selection window.

The mobile terminal 300 transmits the application content selected by the user to the image display apparatus 100. Thus, the user can apply the channel information, except for application content that the user does not want to output to the image display apparatus 100 that can be watched by many persons.

A control method that assigns channel information to application content that is currently executed on the mobile terminal 300 will be described with reference to FIG. 5B. When a predetermined control command is applied while execution information 310 of a predetermined application is output by the mobile terminal 300, an execution app list 320 of an application that is currently executed on the mobile terminal 300 is output. The execution app list 320 includes information on at least one application that is currently executed or deactivated.

When the image display apparatus 100 is wirelessly connected to the mobile terminal 300 in which the execution app list 320 is output, the controller can assign channel information to content of an application included in the execution app list 320. For example, when information on three applications is included in the execution app list 320, three channel information bars may be included in the fourth channel group.

In addition, an execution screen of an application activated before the execution app list 320 is output can be displayed as the fourth channel information image 504. Alternatively, when the execution screen 310 is output by the mobile terminal 300, the execution screen 310 may be output as the fourth channel information image 504.

According to an embodiment of the present invention, when a user receives application content from a mobile terminal while using the mobile terminal, the user can match only the currently executed application content with channel information. Accordingly, only application content the user needs may be output to the image display apparatus 100 including a relatively wide output region.

Referring to FIGS. 5B and 5C, when a plurality of applications are executed on the mobile terminal 100, the controller 140 can preferentially assign the channel information to content of the currently executed application. That is, channel information corresponding to a smaller number can be applied to the application content that is currently executed by the mobile terminal. Here, a time point at which the application is determined to be currently executed corresponds to a time point at which the mobile terminal 300 is connected to the image display apparatus 100.

For example, the controller 140 can match channel information of the channel group images 501, 502, and 503 with content of the first to third applications that are currently executed and apply channel information of channel group images 503 or higher to content of the remaining applications received from the mobile terminal 300. The display unit 132 can visually and distinctly output a channel information bar 505' of the currently executed application content and a channel information bar 505f of the other application content.

According to an embodiment of the present invention, when a mobile terminal is wirelessly connected to the image display apparatus, the user can preferentially assign channel information to an application that is currently executed using the mobile terminal, thus enhancing the user's convenience.

Figure 6A:
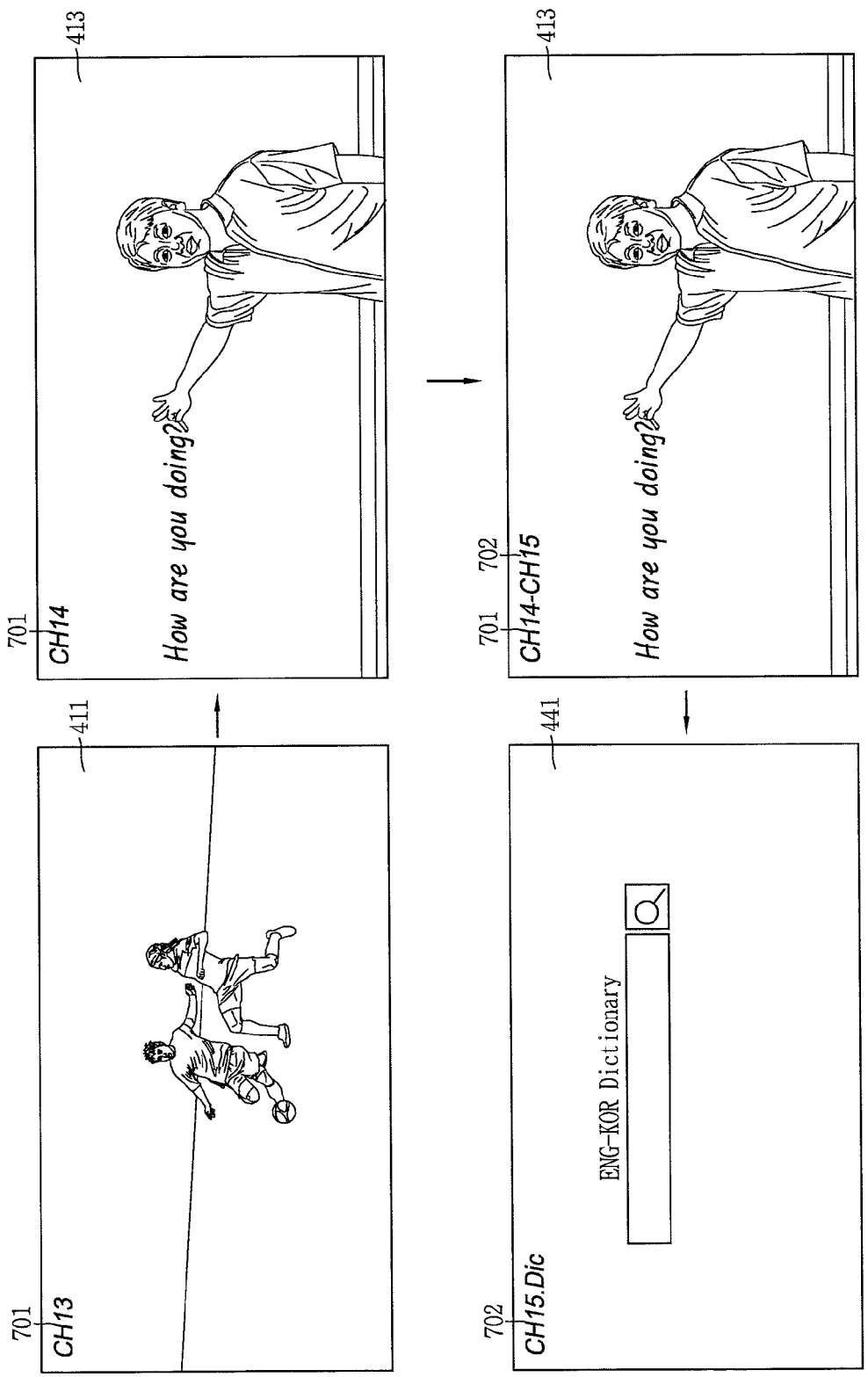
FIGS. 6A to 6C are conceptual views illustrating a control method that forms a temporary channel for application content associated with currently output content.
Figure 6B:
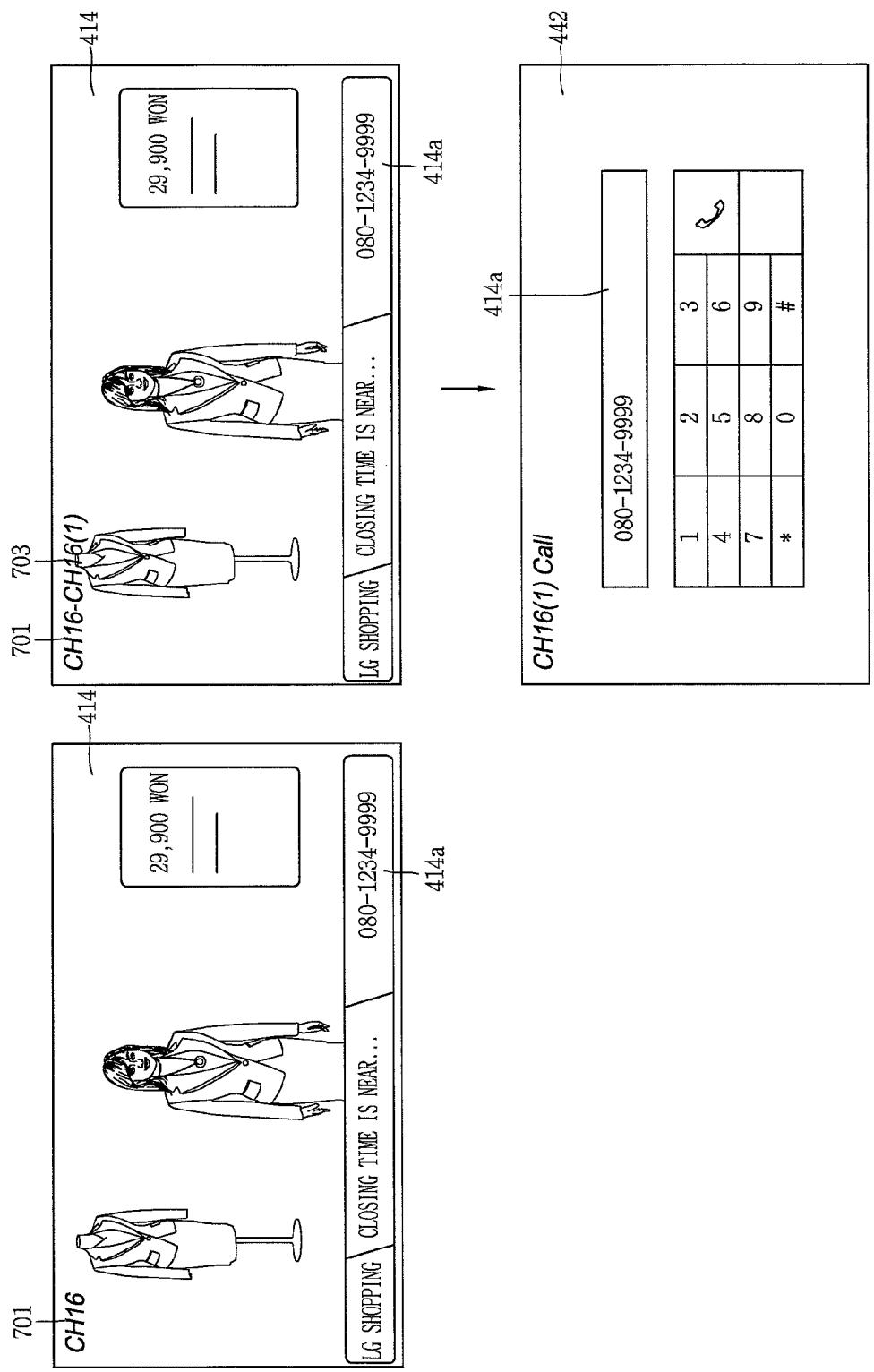
Figure 6C:
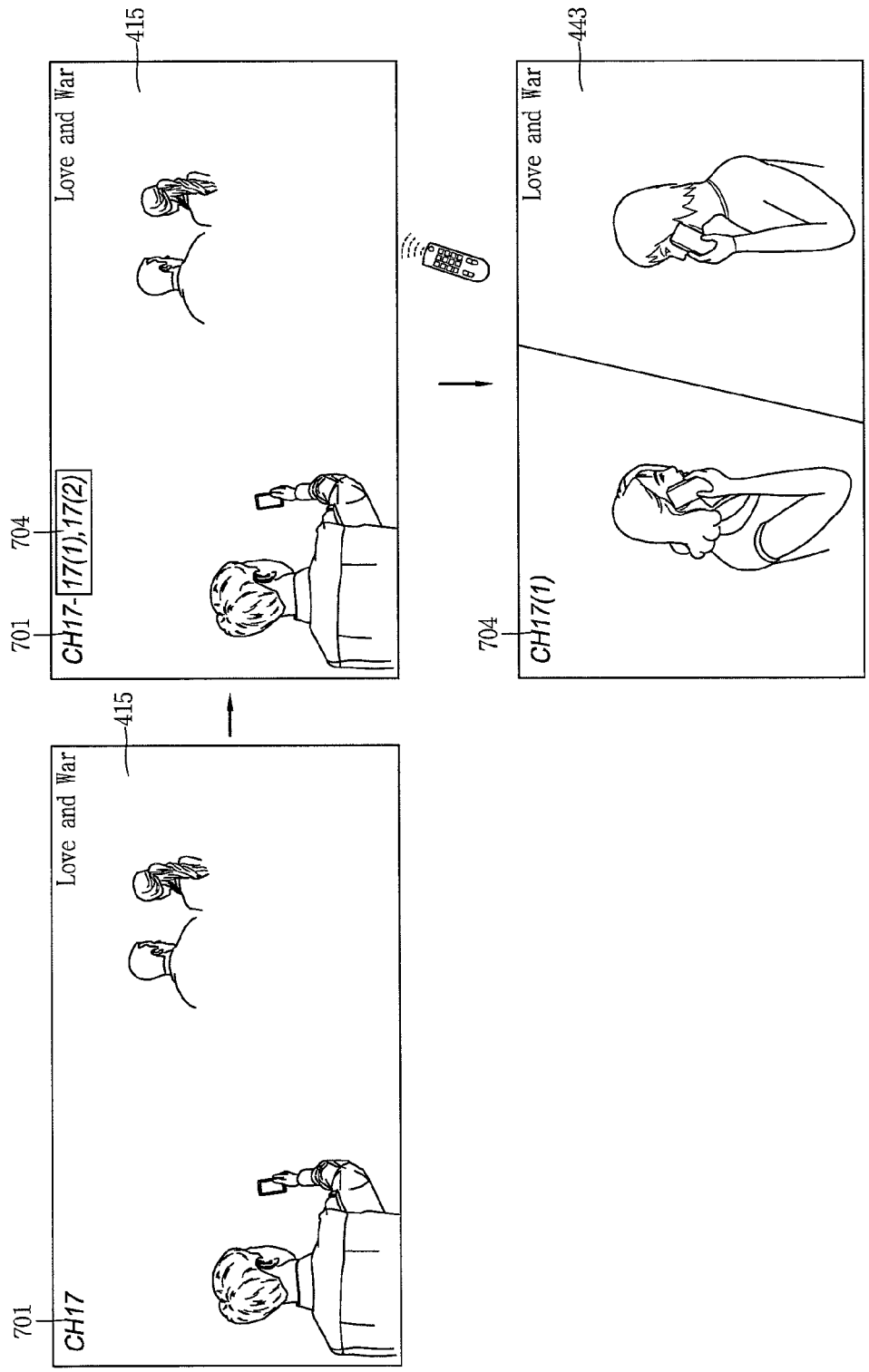

Next, FIGS. 6A to 6C are conceptual views illustrating a control method that forms a temporary channel for application content associated with currently output content. Referring to FIG. 6A, the display unit 132 outputs first broadcast content 411 and first channel information 701 corresponding to the first broadcast content 411. The controller 140 switches the first broadcast content 411 to third broadcast content 413 based on a control command input through the remote control 200 or the mobile terminal 300.

The controller 140 can analyze output information included in the third broadcast content 413 and extract an application content corresponding to the output information. Here, the output information may include text information, image information, and voice information included in the third broadcast content 413 that is output in real time.

For example, when a text is included in the third broadcast content 413, the controller 140 retrieves channel information corresponding to a dictionary application. The controller 140 assigns temporary channel information 702 to the dictionary application content. The temporary channel information 702 is formed in the vicinity of a channel 701 of the third broadcast content 413 that is currently being output. For example, when the channel number of the third broadcast content 413 is 14, the channel number of the temporary channel information 702 may be 15. In this instance, the channel information may be previously applied to application content matched with the temporary channel information 702. However, the number of pieces of the channel information of the application content may be significantly different from the number of pieces of channel information of the third broadcast content 413.

When the temporary channel information is formed, the display unit 132 can output the temporary channel information 702 in addition to the above-described channel information 701. Thus, the controller 140 can directly output the application content 441 based on the channel change control command. In addition, when the currently output broadcast content is changed or when application content assigned the temporary channel information is output one time, the temporary channel information may be deleted.

According to an embodiment of the present invention, the temporary channel information is assigned to the application content including a function associated with the content. Thus, when there is an application that needs to be executed, the user can easily receive the application content while watching the content.

Referring to FIG. 6B, the controller 140 can control the display unit 132 to provide application content including output information included in the currently output content. The controller 140 extracts output information 414a from fourth broadcast content 414. For example, when phone number information is included in the fourth broadcast content 414, the controller 140 extracts call application content for performing a call function among pieces of the application content and applies the temporary channel information 703 to the call application content. The display unit 132 outputs the temporary channel information 703 in addition to the channel information 701 of the fourth broadcast content 414. The channel number of the temporary channel information 703 may be close to the channel number of the channel information 701.

The controller 140 outputs the application content 442 corresponding to the temporary channel information 703 based on the channel change control command applied by the user while the user is watching the fourth broadcast content 414. The display unit 132 can also output the extracted output information 414a in addition to the application content 442. When the output information 414a is a phone number, the output information 414a may be output to a region of the application content 442 to which an incoming call number is input. Thus, the user can easily control the application. In this instance, the controller 140 can delete the temporary information.

Referring to FIG. 6C, while the fifth broadcast content 415 is output, the controller 140 extracts relevant content associated with the fifth broadcast content 415 using information regarding the fifth broadcast content 415. The controller 140 extracts the relevant content among pieces of content assigned different channel information. The different channel information is not limited to application content installed in the image display apparatus, application content of the mobile terminal, etc.

For example, the relevant content may correspond to content that is a series of the fifth broadcast content 415 or content in the same category. The controller 140 assigns the temporary channel information 704 to the relevant content and controls the display unit to output the temporary channel information 704 in addition to the channel information 701 of the fifth broadcast content 415. A plurality of pieces of the relevant content may be extracted. In this instance, respective temporary channel information or integrated temporary channel information may be assigned to the plurality of pieces of relevant content.

While the fifth broadcast content 415 is output, the controller 140 can control the display unit 132 to output the relevant content 443 assigned the temporary channel based on the channel change control command. Thus, the user need not directly search for the relevant content, but may easily receive the relevant content through the channel change.

Figure 7C:
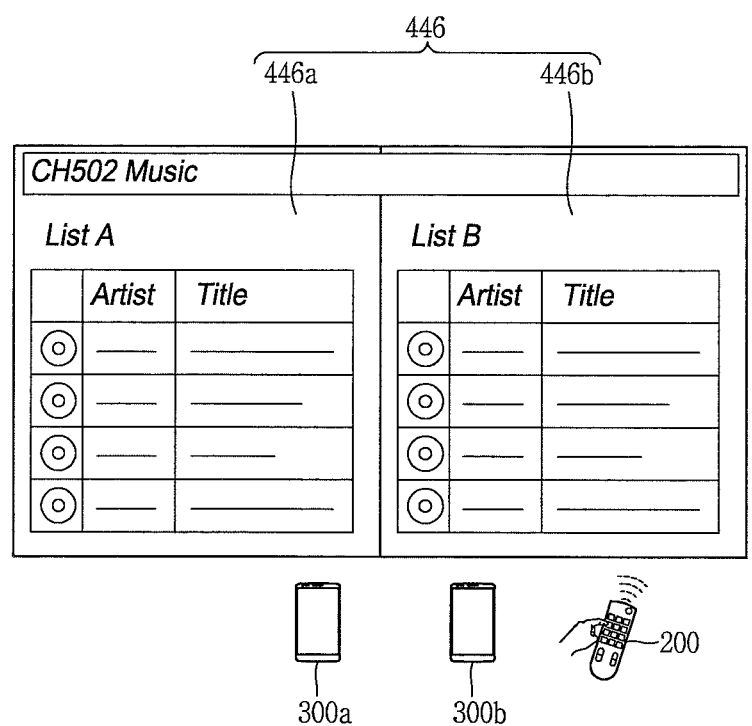

FIGS. 7A to 7C are conceptual views illustrating a control method that applies channel information to content when a plurality of mobile terminal are wirelessly connected to an image display apparatus. Referring to FIG. 7A, the controller 140 can perform wireless connection with the plurality of mobile terminal at the same time. For example, when the first and second mobile terminals 300a and 300b are wirelessly connected to the image display apparatus 100, channel groups corresponding to the first and second mobile terminals 300a and 300b are formed.

The channel information screen 500 includes fifth and sixth channel group images 507a and 570b and fifth and sixth channel information bars 506a and 506b, which correspond to the first and second channel groups. The fifth and sixth channel information bars 506a and 506b correspond to application content installed in the mobile terminals. The controller 140 controls the display unit 132 to form an integrated channel for the same application installed in the first and second mobile terminals 300a and 300b and display an integrated channel information bar 506c based on the setting by the user. The controller 140 keeps an application that is not installed in another mobile terminal to be in independent channel information bars 506a and 506b.

When the integrated channel information bar 506c is selected, the controller 140 controls the display unit 132 to also output application content of the mobile terminals. When there is independent and distinct content that is associated with the integrated application, the display unit 132 can display that the independent content is in different sources (e.g., the first and second mobile terminals 300a and 300b). This may prevent too many channels from being formed, by implementing substantially the same applications as one integrated channel when a plurality of mobile terminals are wirelessly connected to the image display apparatus.

Referring to FIG. 7B, the image display apparatus 100 can be controlled by the mobile terminal 300 that is wirelessly connected to the image display apparatus 100. While the first and second mobile terminals 300a and 300b are connected to the image display apparatus 100, a channel of the image display apparatus 100 can be changed by the second mobile terminal 300b. The controller 140 can output content applied to the integrated channel information (CH501) based on a control command applied by the second mobile terminal 300b.

However, when the content output by the control command is received from the first mobile terminal 300a, the controller 140 can control the display unit 132 to output not the content but a security image 445a. The security image 445a may be replaced with content received from the second mobile terminal 300b.

Alternatively, the controller 140 can output a security information input screen 445b for outputting the content received from the first mobile terminal 300a. When different mobile terminals belong to one user, or when two or more users view the image display apparatus 100, the user can enter a password to output the content. That is, when two or more mobile terminals are connected to the image display apparatus, a user of the mobile terminals may restrict the output of content that the user does not desire to output.

Referring to FIG. 7C, while the first and second mobile terminals 300a and 300b are connected, the controller 140 assigns integrated channel information to one application. Content 446 corresponding to the integrated channel information may include a first region 446a in which screen information of the mobile terminal 300a is output and a second region 446b in which screen information of the mobile terminal 300b is output.

For example, when the screen information is different between substantially the same applications, the screen information can be output independently while one piece of content is output for one channel. For a music replay application, a list of music that is replayed can be output independently in different regions. Thus, while receiving all independent screen information, a user can selectively control the screen information.

Figure 8A:
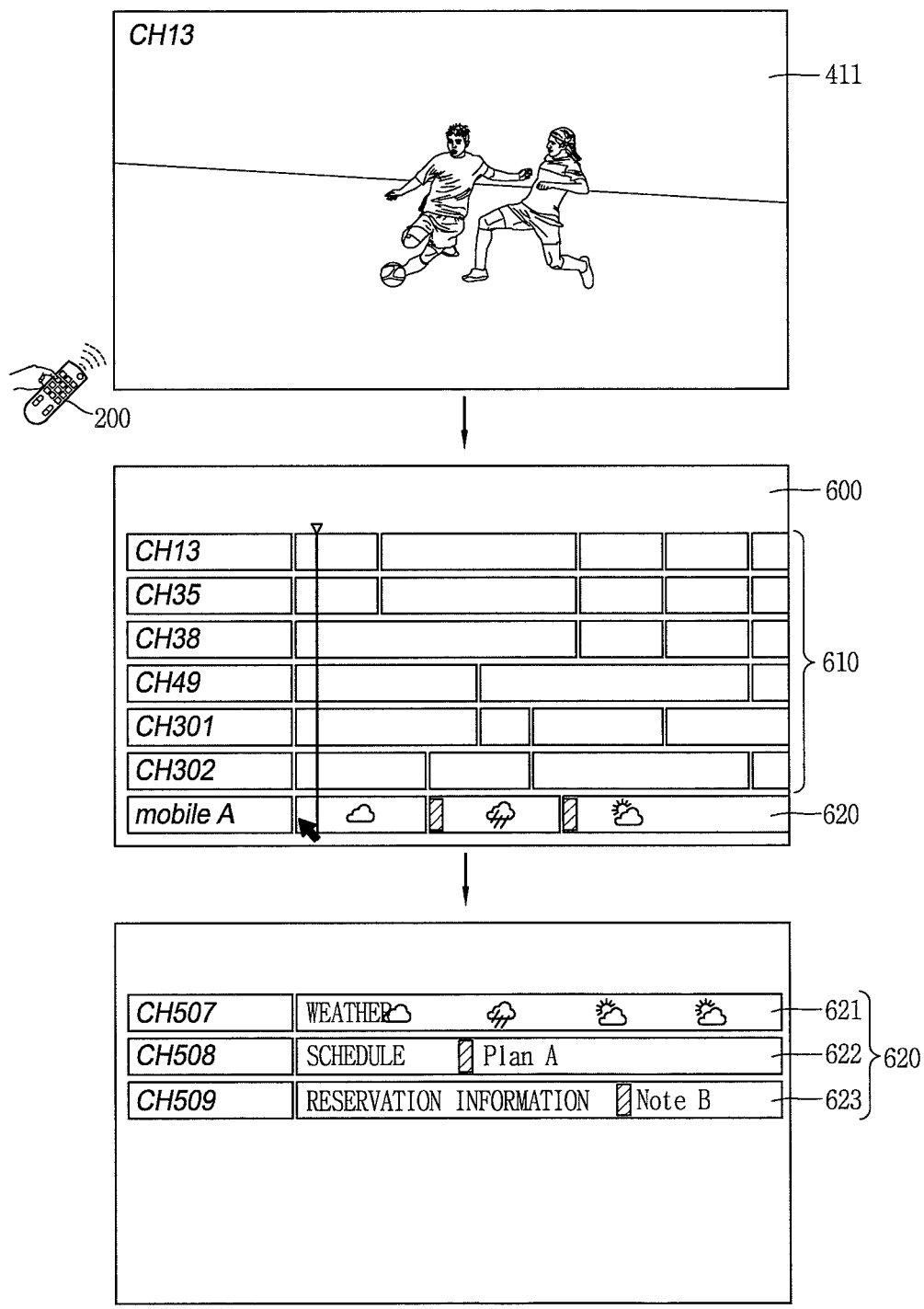
FIGS. 8A and 8B are conceptual views for describing a control method of an electronic program guide (EPG) screen.
Figure 8B:
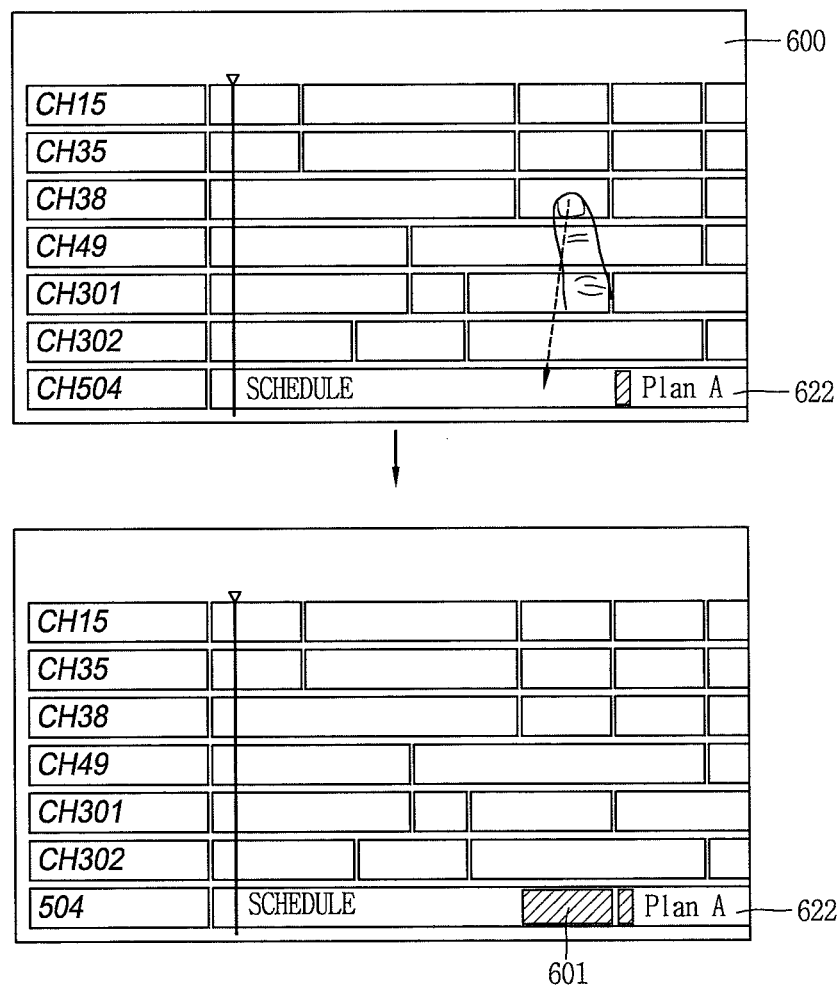

Next, FIGS. 8A and 8B are conceptual views for describing a control method of an electronic program guide (EPG) screen. When the mobile terminal 300 is wirelessly connected, the controller 140 can control the display unit 132 to output channel information of content received from the mobile terminal 300 to the EPG screen.

Referring to FIG. 8A, while the first broadcast content 411 is output, the controller 140 controls the display unit 132 to output a channel guide screen 600 based on a predetermined control command applied from the remote control 200. The channel guide screen 600 includes a plurality of first images 610 that are pieces of output content corresponding to the plurality pieces of channel content arranged with the elapse of time. In addition, the display unit 132 output a second image 620 corresponding to the application content.

The second image 620 includes content information including future time information among the stored content information. For example, the second image 620 includes information regarding weather prediction with time, schedule information including predetermined time information, etc. The second image 620 may indicate content information of a representative application.

When the second image 620 is selected, the controller 140 controls the display unit 132 to output detail images 621, 622, and 623. The detail images 621, 622, and 623 includes channel information assigned to application content including content associated with the future time information. In addition, an image corresponding to application content associated with the future time information may also be output as an image irrelevant to the elapse of time.

Referring to FIG. 8B, the controller 140 can edit the channel guide screen 600 based on a touch applied to the first image 610 and the second image 620. The controller 140 can select one of pieces of content included in the first image 610 and copy the content as the second detail image 622. The content may be represented as a content icon of a predetermined size based on time information.

A copied icon 601 of the content icon may be displayed as the second detail image 622 based on the touch. In this instance, the controller 140 can execute an application function corresponding to the second detail image 622 through the selected content.

Figure 9B:
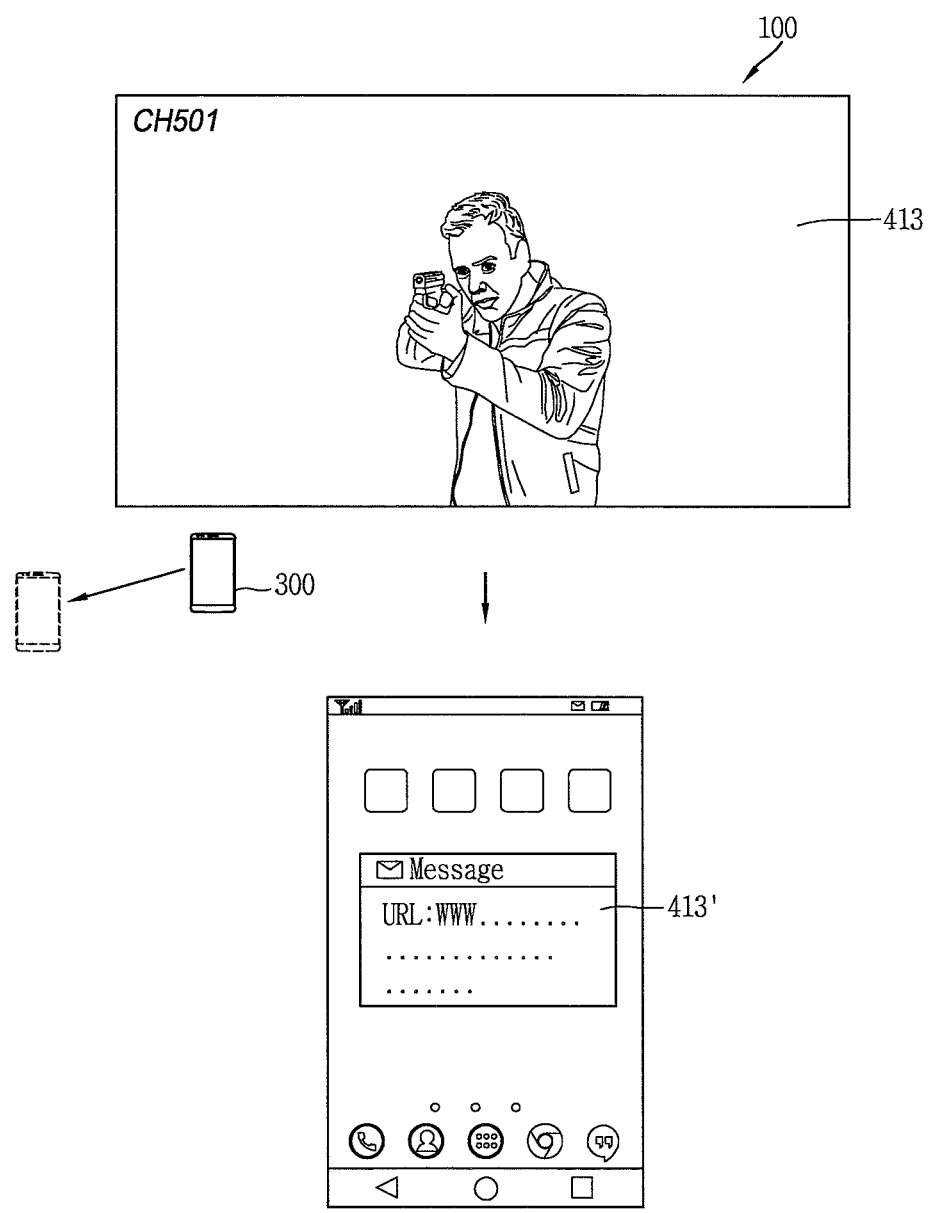

FIGS. 9A and 9B are conceptual views illustrating a control method when wireless connection between a mobile terminal and an image display apparatus is disconnected. Referring to FIG. 9A, when connection with the mobile terminal is limited, the controller 140 can control the display unit 132 to temporarily output a predetermined image 447. The predetermined image 447 may include information that the wireless connection with the mobile terminal 300 has been disconnected.

While content has not been received from the mobile terminal 300, the controller 140 can receive at least some of the application content from a predetermined server (e.g., a cloud server) that interoperates with the mobile terminal 300. Thus, the controller 140 controls the display unit 132 to output application content 448 received from the predetermined server.

Further, the controller 140 can apply the application content received from the predetermined server to previously assigned channel information and then output the application content without any modification or may assign other temporary channel information to the application content. That is, the controller 140 can control the display unit 132 to output access screen information 448' for accessing the predetermined server. The access screen information 448' includes an input window for inputting access information. When the access information is input, the controller 140 can control the display unit 132 to output the application content received from the predetermined server.

Referring to FIG. 9B, when the connection with the mobile terminal 300 is disconnected while the third broadcast content 413 is output, the controller 140 controls the wireless communication unit 160c to transmit connection information 413' associated with the third broadcast content 143 to the mobile terminal 300. The mobile terminal 300 may output the received connection information 413'.

The connection information 413' may correspond to uniform resource locator (URL) information for keeping on receiving the third broadcast content 413 or connection information for directly executing a corresponding application. Thus, even when the user becomes farther away from the image display apparatus 100 while a predetermined content is executed, the user can continuously receive the content.

Figure 10A:
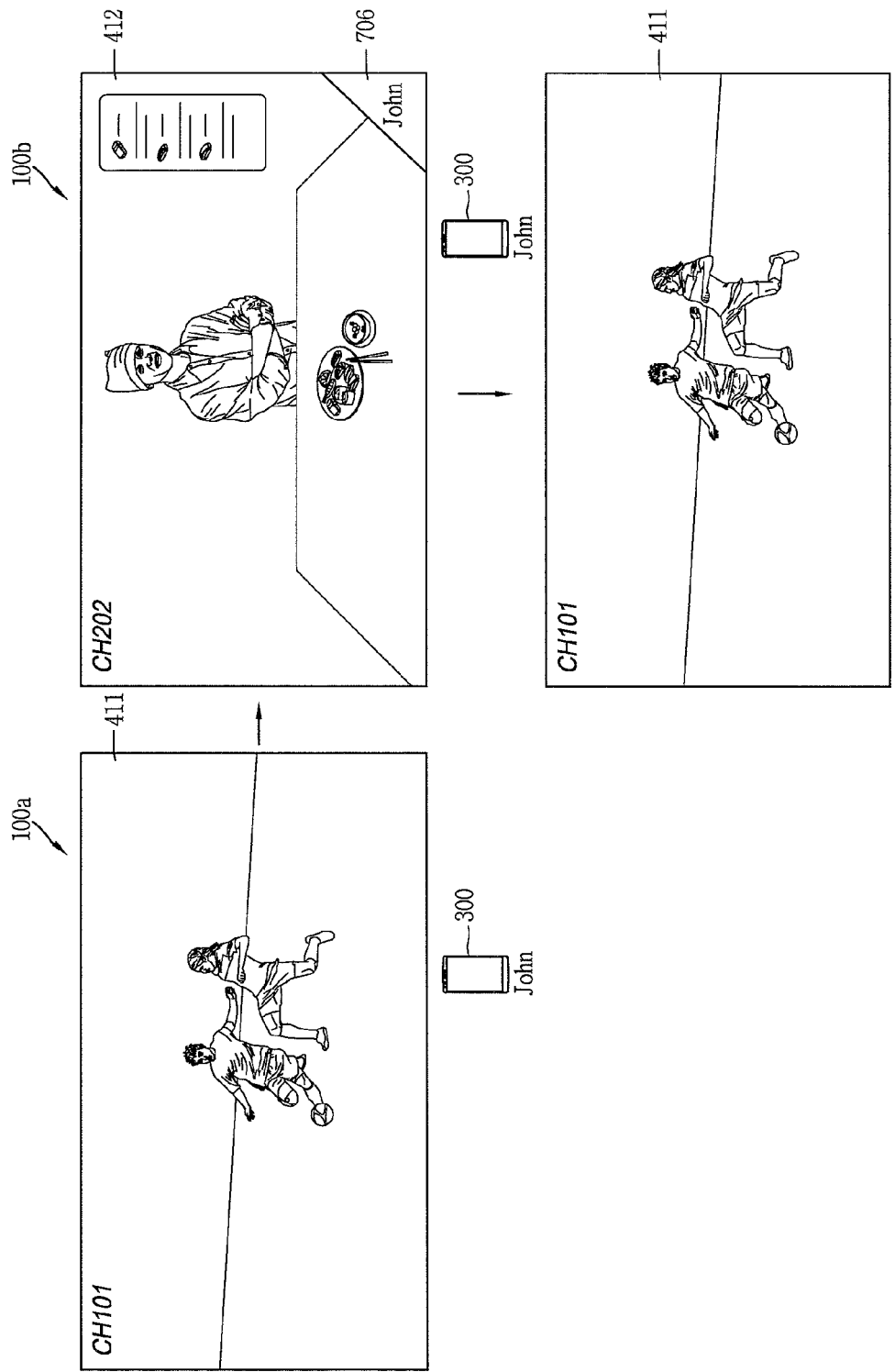
FIGS. 10A and 10B are conceptual views illustrating a control method that provides recommended content information when a mobile terminal is wirelessly connected to another image display apparatus.
Figure 10B:
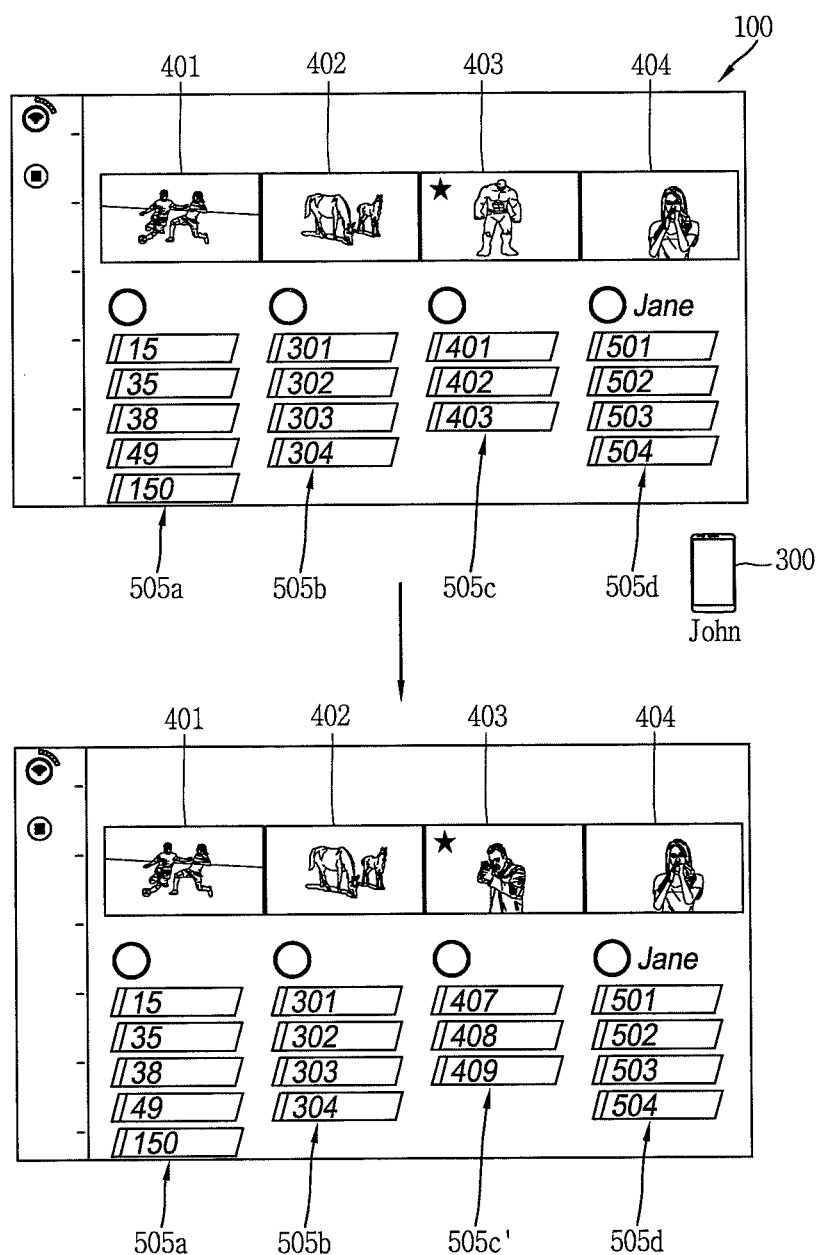

FIGS. 10A and 10B are conceptual views illustrating a control method that provides recommended content information when a mobile terminal is wirelessly connected to another image display apparatus. Referring to FIG. 10A, while wireless connection with the mobile terminal 300a is made, a display unit of a first image display apparatus 100a outputs the first broadcast content 411. When the mobile terminal 300 is wirelessly connected to a second image display apparatus 100b, the second image display apparatus 100b receives content output information that has been output to the first image display apparatus 100a.

When wireless connection with the mobile terminal 300 is made, the second image display apparatus 100b can output an output information image 706 based on the output information. When the output information image 706 is selected, the controller 140 can control the display unit to continuously output the content that has been output based on the output information. Thus, the user can wirelessly connect the mobile terminal with a plurality of image display apparatuses to continuously output content that has been previously provided.

Referring to FIG. 10B, when another different mobile terminal 300 is wirelessly connected to the image display apparatus 100, the controller changes channel information of another channel group. For example, when the mobile terminal wirelessly connected to the image display apparatus 100 is changed, a user can form a channel information bar 505c included in a third channel group, which is a favorite content channel, again.

The embodiments of the present invention provide several advantages. For example, the image display apparatus can change previous content channel information based on information received from the connected mobile terminal. Also, substantially the same channel information as that of channels of the broadcast content is assigned to content associated with the application installed in the mobile terminal, and the application content and the broadcast content are selectively output based on the channel change. Thus, the user need not execute another program or apply an additional control command in order to receive the content stored in the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus comprising:
   a tuner configured to receive a broadcast signal;
   a display configured to display broadcast content according to the broadcast signal;
   a wireless communication processor configured to perform wireless communication with a mobile terminal sensed to be positioned within a predetermined range and receive application content from the mobile terminal; and
   a controller configured to:
   display a channel information screen on the display of the image display apparatus, wherein the channel information screen includes:
   a first channel group image identifying a first group of channels of the broadcast content,
   first channel information below the first channel group image and identifying different channels included in the first group of channels,
   a second channel group image identifying a second group of channels of the broadcast content,
   second channel information below the second channel group image and identifying different channels included in the second group of channels,
   a first home screen image identifying a first home screen page displayed on a display of the mobile terminal among a plurality of home screen pages available on the mobile terminal, and
   third channel information below the first home screen image identifying application icons on the first home screen page of the mobile terminal, wherein a number of the displayed third channel information matches a number of icons on the first home screen page displayed on the display of the mobile terminal,
   wherein the controller is further configured to:
   when the first home screen page displayed on the display of the mobile terminal is changed to a second home screen page among the plurality of home screen pages available on the mobile terminal based on a command applied to the mobile terminal, switch displaying the first home screen image to a second home screen image identifying the second home screen page displayed on the display of the mobile terminal, and display fourth channel information below the second home screen image identifying application icons on the second home screen page displayed on the display of the mobile terminal, wherein a number of the displayed fourth channel information matches a number of icons on the second home screen page displayed on the display of the mobile terminal, and
   wherein the third channel information are blank when the mobile terminal is disconnected from the image display apparatus.

2. The image display apparatus of claim 1, wherein the first channel information and the second channel information include corresponding channel numbers and channel associated information and have different shapes.

3. The image display apparatus of claim 1, wherein each of the third channel information and the fourth channel information include an icon corresponding to an icon on the first home screen page and the second home screen page, respectively.

4. The image display apparatus of claim 1, wherein the controller is further configured to display a group guide on the display indicating a channel group of the currently displayed content in addition to the first channel information and the second channel information.

5. The image display apparatus of claim 4, wherein the controller is further configured to display content included in another channel group on the display in response to a control command applied to the group guide.

6. The image display apparatus of claim 1, wherein the controller is further configured to:
   search for relevant content associated with the content based on a predetermined control command,
   set subchannel information for the associated content, and
   display the subchannel information in addition to the content on the display unit.

7. The image display apparatus of claim 1, wherein the controller is further configured to set temporary channel information for application content extracted from the displayed content.

8. The image display apparatus of claim 7, wherein the controller is further configured to display the application content in addition to the temporary channel information.

9. The image display apparatus of claim 7, wherein the controller is further configured to display the content and the temporary channel information together on the display.

10. The image display apparatus of claim 1, wherein, in response to a plurality of mobile terminals being wirelessly connected to the image display apparatus, the controller is further configured to set one piece of channel information for application content associated with a same application among a plurality of pieces of application content received from the plurality of mobile terminals.

11. The image display apparatus of claim 10, wherein, in response to one channel being selected, the controller is further configured to distinguishably display the plurality of pieces of application content received from the plurality of mobile terminals on the display.

12. The image display apparatus of claim 1, wherein, in response to the wireless connection with the mobile terminal being blocked while broadcast content is displayed on the display, the controller is further configured to transmit connection information associated with the broadcast content to the mobile terminal.

13. The image display apparatus of claim 1, wherein, in response to the wireless connection with the mobile terminal being blocked, the controller is further configured to receive the application content from a server associated with the mobile terminal.

14. A method of controlling an image display apparatus, the method comprising:
   receiving, via a tuner, a broadcast signal;
   selectively displaying, via a display, a plurality of pieces of broadcast content according to the broadcast signal;
   performing, via a wireless communication processor, wireless communication with a mobile terminal sensed to be positioned within a predetermined range and receiving a plurality of pieces of application content from the mobile terminal;
   displaying a channel information screen on the display of the image display apparatus, wherein the channel information screen includes:
   a first channel group image identifying a first group of channels of the broadcast content,
   first channel information below the first channel group image and identifying different channels included in the first group of channels, a second channel group image identifying a second group of channels of the broadcast content, second channel information below the second channel group image and identifying different channels included in the second group of channels, a first home screen image identifying a first home screen page displayed on a display of the mobile terminal among a plurality of home screen pages available on the mobile terminal, and third channel information below the first home screen image identifying application icons on the first home screen page of the mobile terminal, wherein a number of the displayed third channel information matches a number of icons on the first home screen page displayed on the display of the mobile terminal, and wherein the method further comprises:

when the first home screen page displayed on the display of the mobile terminal is changed to a second home screen page among the plurality of home screen pages available on the mobile terminal based on a command applied to the mobile terminal, switching display of the first home screen image to a second home screen image identifying the second home screen page displayed on the display of the mobile terminal, and displaying fourth channel information below the second home screen image identifying application icons on the second home screen page displayed on the display of the mobile terminal, wherein a number of the displayed fourth channel information matches a number of icons on the second home screen page displayed on the display of the mobile terminal, and wherein the third channel information are blank when the mobile terminal is disconnected from the image display apparatus.

15. The method of claim 14, wherein the first channel information and the second channel information include channel numbers and channel associated information and have different shapes.

* * * * *